United States Patent
Yasuda et al.

(10) Patent No.: US 6,636,926 B2
(45) Date of Patent: Oct. 21, 2003

(54) SHARED MEMORY MULTIPROCESSOR PERFORMING CACHE COHERENCE CONTROL AND NODE CONTROLLER THEREFOR

(75) Inventors: Yoshiko Yasuda, Tokorozawa (JP); Naoki Hamanaka, Tokyo (JP); Toru Shonai, Hachioji (JP); Hideya Akashi, Kunitachi (JP); Yuji Tsushima, Kokubunji (JP); Keitaro Uehara, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 468 days.

(21) Appl. No.: 09/740,816

(22) Filed: Dec. 21, 2000

(65) Prior Publication Data

US 2001/0005873 A1 Jun. 28, 2001

(30) Foreign Application Priority Data

Dec. 24, 1999 (JP) .......................................... 11-366235

(51) Int. Cl.[7] .................... G06F 13/00; G06F 15/167
(52) U.S. Cl. .................. 710/305; 710/317; 711/141; 709/213; 700/5
(58) Field of Search .......................... 710/305, 317, 710/300, 62, 4, 72; 711/141, 148, 120; 709/213, 214, 251; 700/5; 712/14, 211

(56) References Cited

U.S. PATENT DOCUMENTS 4,747,043 A  *  5/1988  Rodman
6,011,791 A      1/2000  Okada et al.
6,092,173 A  *  7/2000  Sasaki et al.
6,378,029 B1 *  4/2002  Venkitakrishnan et al.
6,466,825 B1 * 10/2002  Wang et al.

OTHER PUBLICATIONS

"RISC System/6000SMP System," 1995 Comcon95 Proceedings, pp. 102–109.

"Starfire: Extending the SMP Envelope," 1998 Micro Jan./Feb. pp. 39–49.

* cited by examiner

Primary Examiner—Gopal C. Ray

(57) ABSTRACT

Each node includes a node controller for decoding the control information and the address information for the access request issued by a processor or an I/O device, generating, based on the result of decoding, the cache coherence control information indicating whether the cache coherence control is required or not, the node information and the unit information for the transfer destination, and adding these information to the access request. An intra-node connection circuit for connecting the units in the node controller holds the cache coherence control information, the node information and the unit information added to the access request. When the cache coherence control information indicates that the cache coherence control is not required and the node information indicates the local node, then the intra-node connection circuit transfers the access request not to the inter-node connection circuit interconnecting the nodes but directly to the unit designated by the unit information.

19 Claims, 12 Drawing Sheets

FIG. 2

| Address | Space | Node | Processor |
|---|---|---|---|
| 00 | MEMORY SPACE | NODE 100 | PROCESSOR 110 |
| 01 | | | PROCESSOR 111 |
| 02 | | | PROCESSOR 112 |
| 03 | | | PROCESSOR 113 |
| A0 | | NODE 101 | PROCESSOR |
| | | | PROCESSOR |
| | | | PROCESSOR |
| B0 | | | PROCESSOR |
| | | NODE 102 | PROCESSOR |
| | | | PROCESSOR |
| | | | PROCESSOR |
| C0 | | | PROCESSOR |
| | | NODE 103 | PROCESSOR |
| | | | PROCESSOR |
| | | | PROCESSOR |
| D0 | | | PROCESSOR |
| | I/O SPACE | NODE 100 | PROCESSOR 110 |
| | | | PROCESSOR 111 |
| | | | PROCESSOR 112 |
| F0 | | | PROCESSOR 113 |
| | | NODE 101 | PROCESSOR |
| | | | PROCESSOR |
| | | | PROCESSOR |
| G0 | | | PROCESSOR |
| | | NODE 102 | PROCESSOR |
| | | | PROCESSOR |
| | | | PROCESSOR |
| E0 | | | PROCESSOR |
| | | NODE 103 | PROCESSOR |
| | | | PROCESSOR |
| | | | PROCESSOR |
| MAX ADDRESS | | | PROCESSOR |

FIG. 3A
FIG. 3B
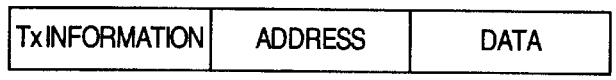
FIG. 3C
| TYPE OF ACCESS REQUEST | Tx INFORMATION |
|---|---|
| READ REQUEST REQUIRING CACHE COHERENCE CONTROL | TYPE1 |
| WRITE REQUEST REQUIRING CACHE COHERENCE CONTROL | TYPE2 |
| READ REQUEST NOT REQUIRING CACHE COHERENCE CONTROL | TYPE3 |
| WRITE REQUEST NOT REQUIRING CACHE COHERENCE CONTROL | TYPE4 |
| READ RESPONSE | TYPE5 |

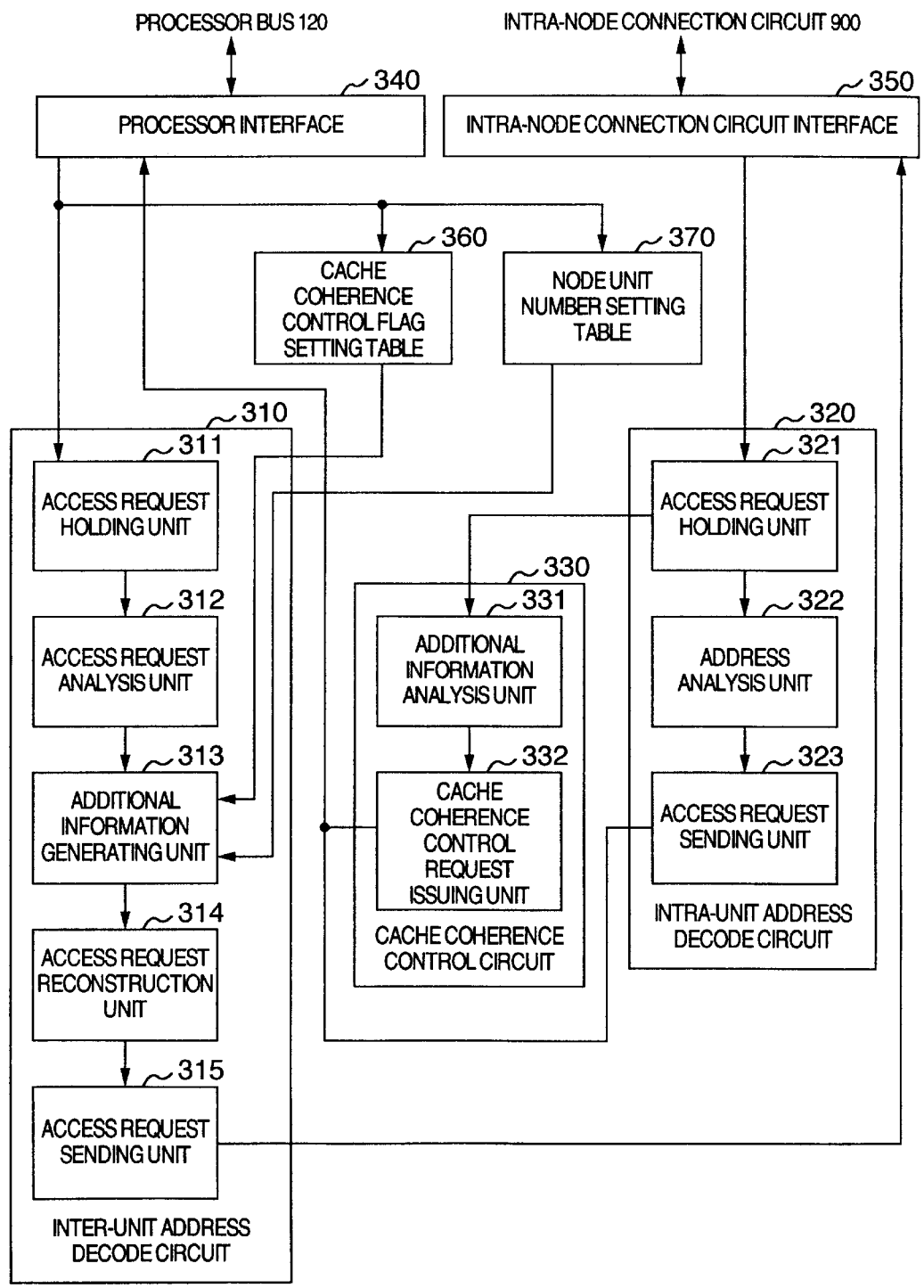

| Tx INFORMATION | CACHE COHERENCE CONTROL FLAG |
|---|---|
| TYPE1 | 1 |
| TYPE2 | 1 |
| TYPE3 | 0 |
| TYPE4 | 0 |
| TYPE5 | 0 |

| ADDRESS RANGE | | NODE NO. | UNIT NO. | NODE INDICATED BY NODE NO. | UNIT INDICATED BY UNIT NO. |
|---|---|---|---|---|---|
| MINIMUM | MAXIMUM | | | | |
| 00 | A0 | 0 | 1 | 100 | 500 |
| A0 | B0 | 1 | 1 | 101 | 500 |
| B0 | C0 | 2 | 1 | 102 | 500 |
| C0 | D0 | 3 | 1 | 103 | 500 |
| D0 | E0 | 0 | 2 | 100 | 400 |
| E0 | F0 | 1 | 2 | 101 | 400 |
| F0 | G0 | 2 | 2 | 102 | 400 |
| G0 | MAX | 3 | 2 | 103 | 400 |

FIG. 11

| ACCESS REQUEST TRANSFER SOURCE UNIT | CACHE COHERENCE CONTROL FLAG | OUTPUT OF NODE NO. COHERENCE DETERMINING CIRCUIT | SELECT SIGNAL OUTPUT DESTINATION UNIT |
|---|---|---|---|
| PROCESSOR UNIT | 0 | 0 | NETWORK UNIT |
| | 0 | 1 | UNIT NO. DESIGNATION UNIT |
| | 1 | 0 | NETWORK UNIT |
| | 1 | 1 | NETWORK UNIT<br>UNIT NO. DESIGNATION UNIT |
| I/O UNIT | 0 | 0 | NETWORK UNIT |
| | 0 | 1 | UNIT NO. DESIGNATION UNIT |
| | 1 | 0 | NETWORK UNIT |
| | 1 | 1 | NETWORK UNIT<br>UNIT NO. DESIGNATION UNIT |
| NETWORK UNIT | 0 | 0 | NOT OUTPUT |
| | 0 | 1 | UNIT NO. DESIGNATION UNIT |
| | 1 | 0 | PROCESSOR UNIT |
| | 1 | 1 | PROCESSOR UNIT<br>UNIT NO. DESIGNATION UNIT |
| MEMORY UNIT | * | 0 | NETWORK UNIT |
| | * | 1 | ACCESS REQUEST TRANSFER SOURCE UNIT |

| NODE NO. | CACHE COHERENCE CONTROL REQUIRED OR NOT |
|---|---|
| 100 | 1 |
| 101 | 1 |
| 102 | 0 |
| 103 | 1 |

# SHARED MEMORY MULTIPROCESSOR PERFORMING CACHE COHERENCE CONTROL AND NODE CONTROLLER THEREFOR

BACKGROUND OF THE INVENTION

The present invention relates to a multiprocessor system configured with a plurality of processors for realizing a high performance, or in particular to a shared memory multiprocessor for performing the cache coherence control against access requests and a node controller used with the same multiprocessor.

In a well-known method for implementing a shared memory multiprocessor, a plurality of nodes each configured with only processing units having cache memories are connected to each other by a single bus, and further a memory device and an I/O device are connected to the bus. The memory device and the I/O device are shared by the nodes both physically and logically, thereby making up what is called a shared memory multiprocessor. This system comprising a plurality of nodes connected by a single bus is inexpensive and can be configured in a simplistic fashion. In view of the fact that there is only one path for transferring data between the nodes connected to each other, however, the data bus constitutes a bottleneck to what otherwise might be a successful attempt to improve the performance of the system as a whole by increasing the number of nodes.

As a solution to this problem, there has been proposed a method in which a bus is used to transfer an access request (address) for the memory device or the I/O device, while a crossbar switch is used for data transfer.

The 1995 COMPCON95 Proceedings, p.p. 102–109 entitled "RISC System/6000SMP System" (first reference) proposes a system having a physically-shared and logically-shared memory in which a bus is used for address transfer while a crossbar switch is used for data transfer requiring a high throughput.

Generally, a shared memory multiprocessor employing a bus for address transfer uses an address snoop system as a method of maintaining the data coherence between a memory device and the cache memories included in the nodes. In the address snoop system, an address is broadcast in order to maintain the data coherence between all the nodes connected to the bus.

In the system disclosed in the first reference described above, the data throughput can be improved by employing a crossbar switch in place of a bus for data transfer. The use of a single bus for address transfer as in the prior art, however, makes it impossible to realize an efficient address snoop system in keeping with the improved throughput.

In order to obviate the bus neck posed when using a single bus for address transfer, on the other hand, "STARFIRE: extending the SMP Envelop", 1998 MICRO January/February, pp. 39–49 (second reference) introduces a system which uses multiple buses for address transfer.

The system according to the second reference described above, in which each node is not configured only with a processor having a cache memory, is a multiprocessor system in which each node is configured with a processor including a cache memory, a memory and an I/O device. This system is what is called a distributed shared memory multiprocessor (physically-distributed logically-shared memory multiprocessor), in which the memories and the I/O devices are distributed physically among the nodes but shared logically by the nodes. In the system according to the second reference, a plurality of nodes are coupled to each other by buses for address and coupled by a crossbar switch for data. By use of four address buses, four address snoop operations can be performed in parallel. The physical address space is divided into four parts so that each address bus can snoop different address spaces at the same time.

The use of multiple buses for address transfer as in the second reference makes it possible to realize a more efficient address snoop than when using a single bus.

In the first and second references, however, the bus is used for address transfer and therefore the right to use the address bus is required to be secured even in the case where data coherence is not required between a cache memory and a memory device. Thus, the address bus cannot be used efficiently.

In order to obviate this problem, U.S. Pat. No. 6,011,791 (third reference) discloses what is called a physically-shared logically-shared memory multiprocessor in which the address bus is eliminated and the address is transferred to a crossbar switch for data use. In this system, the address can be transferred only to a node intended as a transfer destination in the case where data coherence is not need between the cache memory and the memory device.

SUMMARY OF THE INVENTION

The use of multiple buses for address transfer as in the second reference can realize the address snoop more efficient than when a single bus is used. In the case where a multiplicity of nodes are involved, however, even the use of multiple buses cannot secure the throughput of the address snoop commensurate with the improved throughput of the data transfer by the crossbar switch.

According to the third reference in which the address bus is disused and the address and the data area transferred through a single crossbar switch, a sufficient throughput of the address snoop cannot be secured in the case where the nodes are increased in number.

In all the conventional systems described above, an address is transferred to all the nodes in the case where data coherence is required between the cache memory and the memory device. According to the second reference, for example, an address is broadcast to all the nodes in the case where data coherence is required.

In view of this, the present inventors have conducted the following study. Specifically, in the case where data coherence is required, the address is required to be transferred only to the nodes having a cache (i.e. the nodes requiring cache coherence control for an access request), but the address transfer is not required to the nodes having no cache (i.e. the nodes requiring no cache coherence control for an access request). In the prior art, however, the address is transferred also to the nodes having no cache, thereby deteriorating the utilization efficiency of the path (regardless of whether the path is a crossbar switch or a bus). In the case where the nodes are increased in number, therefore, a sufficient throughput of the address snoop cannot be secured.

In the case where no data coherence is required between the cache memory and the memory device, the address is required to be transferred only to the nodes to which data coherence is required.

Specifically, the address is required to be transferred only to the nodes requiring data coherence, and therefore means is required for the one-to-many transferring (multicast) as well as the one-to-all transferring (broadcast).

The present inventors have proposed a shared memory multiprocessor system, in which each node is not configured only with processing units including cache memories but includes at least one processing unit each having a cache memory combined with at least one of a memory device and an I/O device, so that a plurality of the nodes have different configurations. Also in this distributed shared memory multiprocessor, the address is required to be transferred only to the nodes requiring cache coherence control for an access request but no address transfer is required to the nodes not requiring cache coherence control for an access request.

Accordingly, an object of the present invention is to provide a distributed shared memory multiprocessor configured with a plurality of different nodes and capable of efficient address snoop.

Another object of the invention is to provide a distributed shared memory multiprocessor configured with a plurality of nodes and capable of efficient address snoop, wherein the address is not transferred to the nodes not requiring coherence (i.e. the nodes not requiring cache coherence control for an access request) regardless of whether data coherence control is required or not between the cache memory and the memory device.

In order to achieve these objects, according to one aspect of the invention, there is provided a shared memory multiprocessor, wherein each node includes a unit for adding to an access request the information indicating whether data coherence (cache coherence control) is required or not and the information on the node intended as a transfer destination, and an inter-node connection network includes a unit which, based on the information added to the access request transferred from the node, transfers an address to all the nodes connected to the inter-node connection network which have a cache (all the nodes requiring cache coherence control for an access request) in the case where data coherence is required, and transfers the address, in one-to-one correspondence, only to the nodes intended as a transfer destination indicated by the node information in the case where data coherence is not required.

As a result, no address is transferred to the nodes not requiring data coherence and an efficient address snoop system is realized. In other words, the unrequited address transfer is eliminated and the effective throughput of the inter-node connection network is improved.

According to an embodiment of the invention, there is provided a shared memory multiprocessor further comprising a unit for transferring an address directly to a unit (memory device or I/O device) in the same node (local node) as the source of an access request without sending it to the inter-node connection network in the case where data coherence is not required between the cache memory and the memory device and the destination of transfer is the particular unit in the local node, based on the information added to the access request. As a result, the unrequited transfer can be eliminated. Also, it is possible to improve the effective throughput of both the inter-node connection network and intra-node paths.

According to another embodiment of the invention, a crossbar switch but not a bus is preferably employed also for address transfer, and the address snoop between the nodes is carried out through the crossbar switch thereby to secure a scaleable throughput of the address snoop commensurate with the data transfer throughput in the crossbar switch connection.

According to still another embodiment of the invention, a crossbar switch but not a bus is preferably employed also for address transfer, and the address path and the data path of each node are configured with an independent crossbar switch.

By connecting the address path and the data path of each node with a crossbar switch, a plurality of address transfers and data transfers can be carried out in parallel as long as the destinations of access are different. Thus, a scaleable throughput of the address snoop commensurate with the data transfer throughput in the crossbar switch connection can be secured.

BRIEF DESCRIPTION OF THE DRAWINGS

FIG. 2 is a diagram showing the address space allocation of the multiprocessor according to an embodiment of the invention.

FIGS. 3A and 3B are diagrams showing an access request format of a multiprocessor according to an embodiment of the invention.

FIG. 3C is a diagram showing the correspondence between the type of access request and transaction information.

FIG. 4 is a diagram showing a configuration of a processor unit of a node controller according to an embodiment of the invention.

FIG. 5 is a diagram showing the correspondence between the transaction information and the cache coherence control flag according to an embodiment of the invention.

FIG. 6 is a diagram showing the correspondence between the address information, the node number and the unit number according to an embodiment of the invention.

FIG. 11 is a diagram showing a select signal output destination unit corresponding to an access request transfer source unit according to an embodiment of the invention.

FIG. 14 is a diagram showing a multicast table of a route designation circuit of an inter-node connection network according to an embodiment of the invention.

DESCRIPTION OF THE EMBODIMENTS

A shared memory multiprocessor according to an embodiment of the invention will be explained in detail below with reference to the accompanying drawings.

Figure 1:
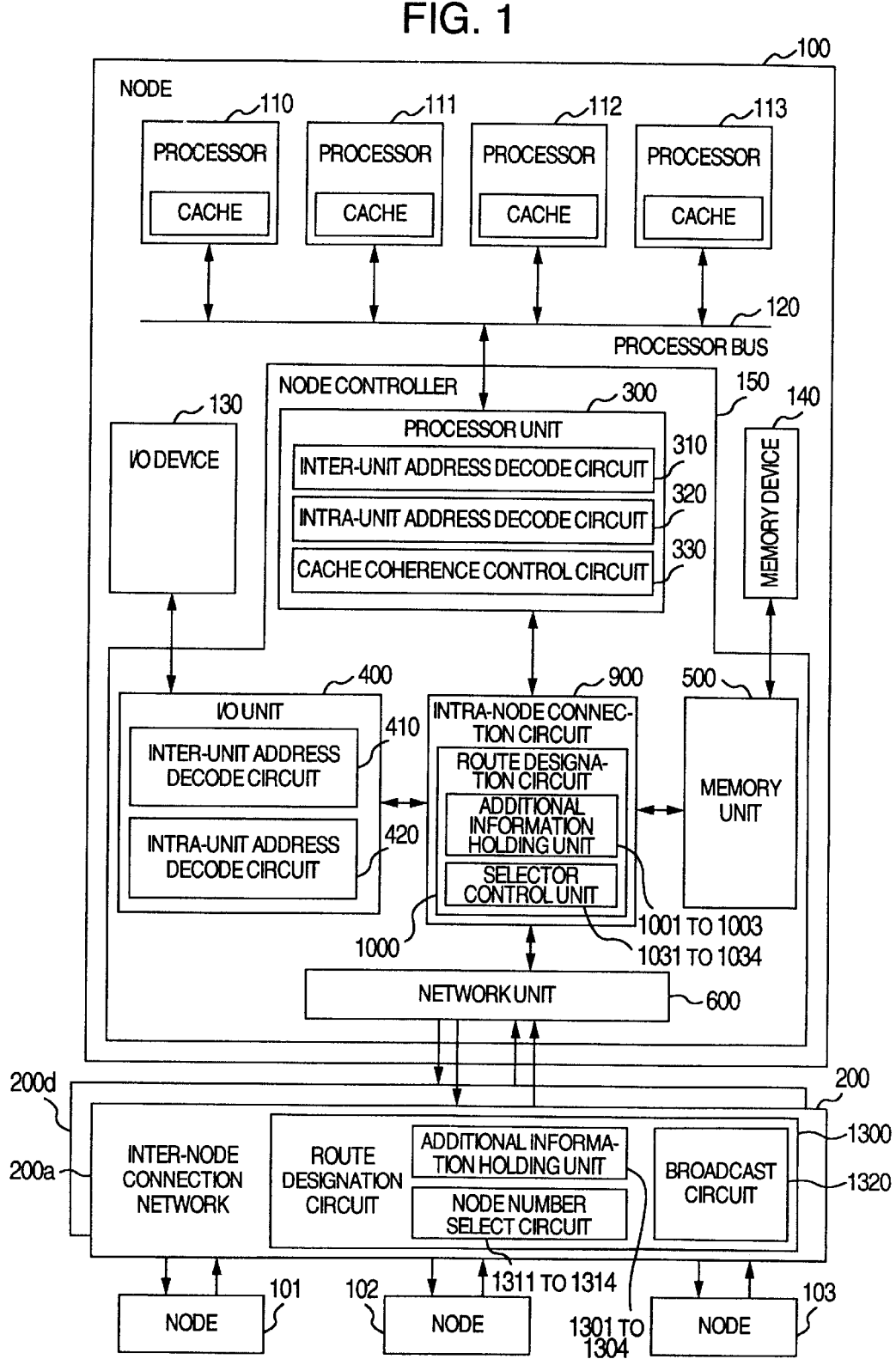
FIG. 1 is a diagram showing a general configuration of a multiprocessor according to an embodiment of the invention.

FIG. 1 shows a general configuration of a shared memory multiprocessor according to an embodiment of the invention. In FIG. 1, reference numerals 100 to 103 designate nodes, and numeral 200 an inter-node connection network. Each of the nodes 100 to 103 are connected to the inter-node connection network 200 for transmitting and receiving data to and from the other nodes through the inter-node connection network 200. The inter-node connection network according to this embodiment is not a bus but a crossbar switch, to which the invention is not limited. In the inter-node connection network, the address path for transferring the address section of an access request and the data path for transferring the data section of the access request are assumed to be configured of a crossbar switch. The address path and the data path may be each connected by a physically independent crossbar switch or may share the same crossbar switch.

The node 100 includes processors 110 to 113, a processor bus 120, an I/O device 130, a memory device 140 and a node controller 150. According to this embodiment, the nodes 101 to 103 have the same configuration as the node 100 and therefore will not be described. Although this embodiment refers to the case in which the node includes four processors, the number of the processors is not limited to four. Nor the number of nodes is limited to four.

As described later, the invention is also applicable to a system in which the nodes 100 to 103 are configured differently.

The processors 110 to 113 each include a cache memory therein. The cache memory caches the data stored in the local and other nodes. The node controller 150 transfers the access request from the processors 110 to 113 to the I/O device 130, the memory device 140 or the inter-node connection network 200. The processor bus 120 connects a plurality of processors.

The node controller 150 includes a processor unit 300 constituting an interface of the processors 110 to 113, an I/O unit 400 constituting an interface with the I/O device 130, a memory unit 500 constituting an interface with the memory device 140, a network unit 600 constituting an interface with the inter-node connection network 200 and an intra-node connection circuit 900 for connecting the nodes.

The processor unit 300 includes an inter-unit address decode circuit 310, an intra-unit address decode circuit 320 and a cache coherence control circuit 330.

The inter-unit address decode circuit 310 decodes the memory access request issued by the processors 110 to 113 or the transaction information and the address information in the I/O access request, and adds to the access request the number of the node (node information) and the number of the unit (unit information) intended as an access request destination and the cache coherence control flag (cache coherence control information) indicating whether the cache coherence control is required or not, and transfers the resulting access request to the intra-node connection circuit 900. The intra-unit address decode circuit 320 decodes the address information for the access request transferred through the intra-node connection circuit 900, and sends it out to the access request source processor. The cache coherence control circuit 330 performs the cache coherence control of the processors 110 to 113 in the case where the cache coherence control flag added to the access request transferred from the network unit 600 indicates that the cache coherence control is required.

The I/O unit 400 includes an inter-unit address decode circuit 410 and an intra-unit address decode circuit 420. The inter-unit address decode circuit 410 decodes the memory access request issued by the I/O device 130 or the transaction information and the address information in the I/O access request, and adds to the access request the number of the node (node information) and the number of the unit (unit information) intended as an access request destination and the cache coherence control flag indicating whether the cache coherence control is required or not, and transfers the resulting access request to the intra-node connection circuit 900. The intra-unit address decode circuit 420 decodes the address information of the access request transferred through the intra-node connection circuit 900 and sends it out to the corresponding access request source I/O device.

The memory unit 500 transfers the access request transferred from the intra-node connection circuit 900 to the memory device 140, decodes the address information in the access request, reads the required data from the memory device 140 and transfers it to the intra-node connection circuit 900. Also, the memory unit 500 writes the data in the memory device 140 in accordance with the address of the access request transferred from the intra-node connection circuit 900.

The network unit 600 transfers an access request which may be transferred thereto from the intra-node connection circuit 900, to the inter-node connection network 200. Also, upon receipt of an access request from the inter-node connection network 200, the network unit 600 transfers the particular request to the intra-node connection circuit 900.

The intra-node connection circuit 900 is configured of a route designation circuit 1000. The route designation circuit 1000 includes additional information holding units 1001 to 1003 and selector control units 1031 to 1034. The additional information holding units 1001 to 1003 in the route designation circuit 1000 hold the cache coherence control flag, the node number and the unit number added to the access request transferred from the processor unit 300. The selector control units 1031 to 1034 select a transfer destination unit of the access request based on the additional information held in the additional information holding units 1001 to 1003.

In the case where the cache coherence control flag indicates that the cache coherence control is required, an access request is transferred to the network unit 600. In the case where the cache coherence control flag indicates that the cache coherence control is not required, on the other hand, an access request is transferred to the unit indicated by the unit number. Also, in the case where the cache coherence control flag added to the access request transferred from the I/O unit 400 indicates that the cache coherence control is required, an access request is transferred to the network unit 600. In the case where the same control flag indicates that the cache coherence control is not required, an access request is transferred to the unit indicated by the unit number. Further, in the case where the cache coherence control flag added to the access request transferred from the network unit 600 indicates that the cache coherence control is required, the particular access request is transferred to the processor unit 300. In the case where the same control flag indicates that the cache coherence control is not required, on the other hand, the particular access request is not transferred from the intra-node connection circuit 900. Furthermore, in the case where the node number added to the access request is that of the local node, the access request is also transferred to the unit corresponding to the unit number through the intra-node connection circuit 900.

The inter-node connection network 200 is configured of at least one route designation circuit 1300. The route designation circuit 1300 transfers an access request to a given node in accordance with the cache coherence control flag and the node number added to the access request transferred from each node. The route designation circuit 1300 includes additional information holding units 1301 to 1304, node number select circuits 1311 to 1314 and a broadcast circuit 1320. The additional information holding units 1301 to 1304 in the route designation circuit 1300 hold the cache coherence control flag and the node number added to the access request transferred from each node. The node number select circuits 1311 to 1314 and the broadcast circuit 1320 transfer an access request to all the nodes or a specific node(s) using the cache coherence control flag and the node number held in the additional information holding units 1301 to 1304.

As described above, the inter-node connection network 200, if configured of a crossbar switch with the address path and the data path physically independent of each other, has crossbar switches 200a, 200b configured physically separate from each other, as shown in FIG. 1.

In the case where the cache coherence control flag added to the access request from each node indicates that the cache coherence control is required, the particular access request is broadcast to all the nodes. In the case where the cache coherence control flag indicates that the cache coherence control is not required, on the other hand, the access request is transferred to the node corresponding to the node number added to the access request.

This embodiment has the feature that in the case where an access request is issued by a processor or an I/O device, the inter-unit address decode circuit 310 or 410 decodes the transaction information and the address information of the access request, and adds the cache coherence control flag and the node number and the unit number intended as a transfer destination to the access request.

Also, another feature is that the additional information for the access request (the cache coherence control flag, the node number and the unit number) are held in the additional information holding units 1001 and 1201, and the intra-node connection circuit 900 and the inter-node connection circuit 1200 are controlled in accordance with the information held in the additional information holding units 1001 to 1201.

More specifically, in the case where the contents of the cache coherence control flag constituting the additional information of the access request from the processors 110 to 113 or the I/O device 130 indicate that the cache coherence control is required, the access request is sent to the inter-node connection network 200 through the intra-node connection circuit 900 and the network unit 600, and broadcast to all the nodes from the inter-node connection network 200. In the case where the contents of the cache coherence control flag constituting the additional information of the access request from the processors 110 to 113 or the I/O device 130 indicate that the cache coherence control is not required and the node number in the additional information indicates the local node, on the other hand, the access request is sent out to the unit indicated by the unit number in the additional information through the intra-node connection circuit 900, but not to the network unit 600. Also, in the case where the contents of the cache coherence control flag constituting the additional information of the access request from the processors 110 to 113 or the I/O device 130 indicate that the cache coherence control is not required and the node number in the additional information indicates a remote node, the access request is sent out to the inter-node connection network 200 through the intra-node connection circuit 900 and the network unit 600. The inter-node connection network 200 sends out the access request only to the node corresponding to the node number added to the access request transferred from the network unit 600.

The access request that has been transferred to the intra-node connection circuit 900 through the network unit 600 from the inter-node connection network 200 is sent out to the processor unit 300 in the case where the contents of the cache coherence control flag in the additional information indicate that the cache coherence control is required, in which case the cache coherence control is performed in the cache coherence control circuit 340. In the case where the cache coherence control flag indicates that the cache coherence control is required and the node number in the additional information indicates the local node, a cache coherence control request is transferred to the processor unit 300 while at the same time sending out an access request to the unit indicated by the unit number in the additional information. In the case where the cache coherence control flag indicates that the cache coherence control is not required and the node number in the additional information indicates the local node, on the other hand, an access request is sent out only to the unit indicated by the unit number in the additional information through the intra-node connection circuit 900.

FIG. 2 shows an example of address space allocation according to this embodiment. In this embodiment, the area of address 00 to less than address A0 is allocated to the memory device 140 of the node 100, the area of address A0 to less than address B0 is allocated to the memory device of the node 101, the area of address B0 to less than address C0 is allotted to the memory device of the node 102, and the area of address C0 to less than address D0 is allocated to the memory device of the node 103. The memory space of the node 100 is further divided into memory spaces of the processors 110 to 113, so that the area of addresses 00 to less than 01 is allocated to the memory space of the processor 110, the area of addresses 01 to less than 02 is allocated to the memory space of the processor 111, the area of addresses 02 to less than 03 is allocated to the memory space of the processor 112, and the area of addresses 03 to less than 04 is allocated to the memory space of the processor 113. The memory spaces of the nodes 101 to 103 are also allocated in similar fashion. The address D0 and higher addresses are allocated as an I/O space. The address of the I/O space is also allocated for each node and each processor. Thus, the area of addresses D0 to less than E0 is allocated as an I/O space of the node 100, the area of addresses E0 to less than F0 is allocated as an I/O space of the node 101, the area of addresses F0 to less than G0 is allocated as an I/O space of the node 102, and the area of addresses G0 to less than address MAX is allocated as an I/O space of the node 103. The I/O space of the node 100 is further allotted to the I/O spaces of the processors 110 to 113 in the node 100. The I/O spaces of the processors in the nodes 101 to 103 are also allocated in similar fashion.

FIGS. 3A to 3C show an example of access requests according to this embodiment. FIGS. 3A and 3B show formats of access requests. In the case of a read request, as shown in FIG. 3A, the access request is composed of transaction (Tx) information indicating the type of the request and an access destination address. In the case of a read response and a write request, on the other hand, as shown in FIG. 3B, the access request is composed of the Tx information, the access destination address and the data. FIG. 3C shows the type of an access request and the Tx information thereof. The access request is of five types including a read request requiring cache coherence control, a write request requiring cache coherence control, a read request not requiring cache coherence control, a write request not requiring cache coherence control and a read response. The Tx information of Types 1 to 5 are set for the access requests, respectively.

The address space allocation and the type of the access request described above are not unique to this invention but generally used.

Now, the internal structure and the operation of the processor unit 300 in the node controller 150 constituting a feature of the invention will be explained with reference to FIG. 4.

The processor unit 300 includes a processor interface 340, an intra-node connection circuit interface 350, an inter-unit address decode circuit 310, an intra-unit address decode circuit 320, a cache coherence control circuit 330, a cache coherence control flag setting table (i.e. a memory for setting the cache coherence control information) 360, and a node/unit number setting table (i.e. a memory for setting the node/unit number) 370.

According to this invention, novel component parts include the inter-unit address decode circuit 310, the cache coherence control circuit 330, the cache coherence control flag setting table 360 and the node/unit number setting table 370.

The processor interface 340 receives an access request from the processors 110 to 113 through the processor bus 120, and transmits a response (the result of reading from the memory device or the I/O device) to the access request and the cache coherence control request from other nodes to the processors 110 to 113 through the processor bus 120.

The intra-node connection circuit interface 350 receives an access request from other units in the node and an access request from the inter-node connection network 200 through the intra-node connection circuit 900, and transmits the access request received from the processor unit 300 to the intra-node connection circuit 900.

The inter-unit address decode circuit 310 is configured with an access request holding unit 311, an access request analysis unit 312, an additional information generating unit 313, an access request reconstruction unit 314 and an access request sending unit 315. The access request holding unit 311 holds the Tx information and the address of the access request transferred from the processor bus 120 through the processor interface 340. The address request analysis unit 312 decodes the Tx information and the address held in the access request holding unit 311. The additional information generating unit 313 compares the result of decoding in the access request analysis unit 312 with the contents of the cache coherence control flag setting table 360 and the node/unit number setting table 370, and generates the additional information including the cache coherence control flag, the node number and the unit number. The access request reconstruction unit 314 adds the additional information generated in the additional information generating unit 313 to the access request, and reconstructs the access request. The access request sending unit 315 sends out the access request to the intra-node connection circuit interface 350.

According to this invention, the additional information generating unit 313 and the access request reconstruction unit 314 included in the inter-unit address decode circuit 310 are novel component parts.

The cache coherence control flag setting table 360 is a memory or a table, for example, for setting the cache coherence control flag (cache coherence control information) indicating whether the cache coherence control is required for the Tx information of each access request. FIG. 5 shows the contents the Tx information and the cache coherence control flag. As shown in FIG. 5, in the case of an access request requiring the cache coherence control, the cache coherence control flag is set to 1, while in the case of an access request not requiring the cache coherence control, the cache coherence control flag is set to 0.

The node/unit number setting table 370 is a memory or a table, for example, for setting the node number and the unit number for the address of each access request. FIG. 6 shows an address range and the node number and the unit number corresponding thereto. Further, the node and the unit indicated by each node number and each unit number, respectively, are shown in FIG. 6. The address space allocation according to the invention is shown in FIG. 2. In the case where the address of the access request is address 00 to less than address A0, the node number and the unit number are 0 and 1, respectively, indicating the node 100 and the memory unit 500 in FIG. 1.

The cache coherence control flag setting table 360 and the node/unit number setting table 370 are prepared at the time of starting the operation of the system.

According to this invention, the cache coherence control flag setting table 360 and the node/unit number setting table 370 constitute novel component parts.

Figure 7:
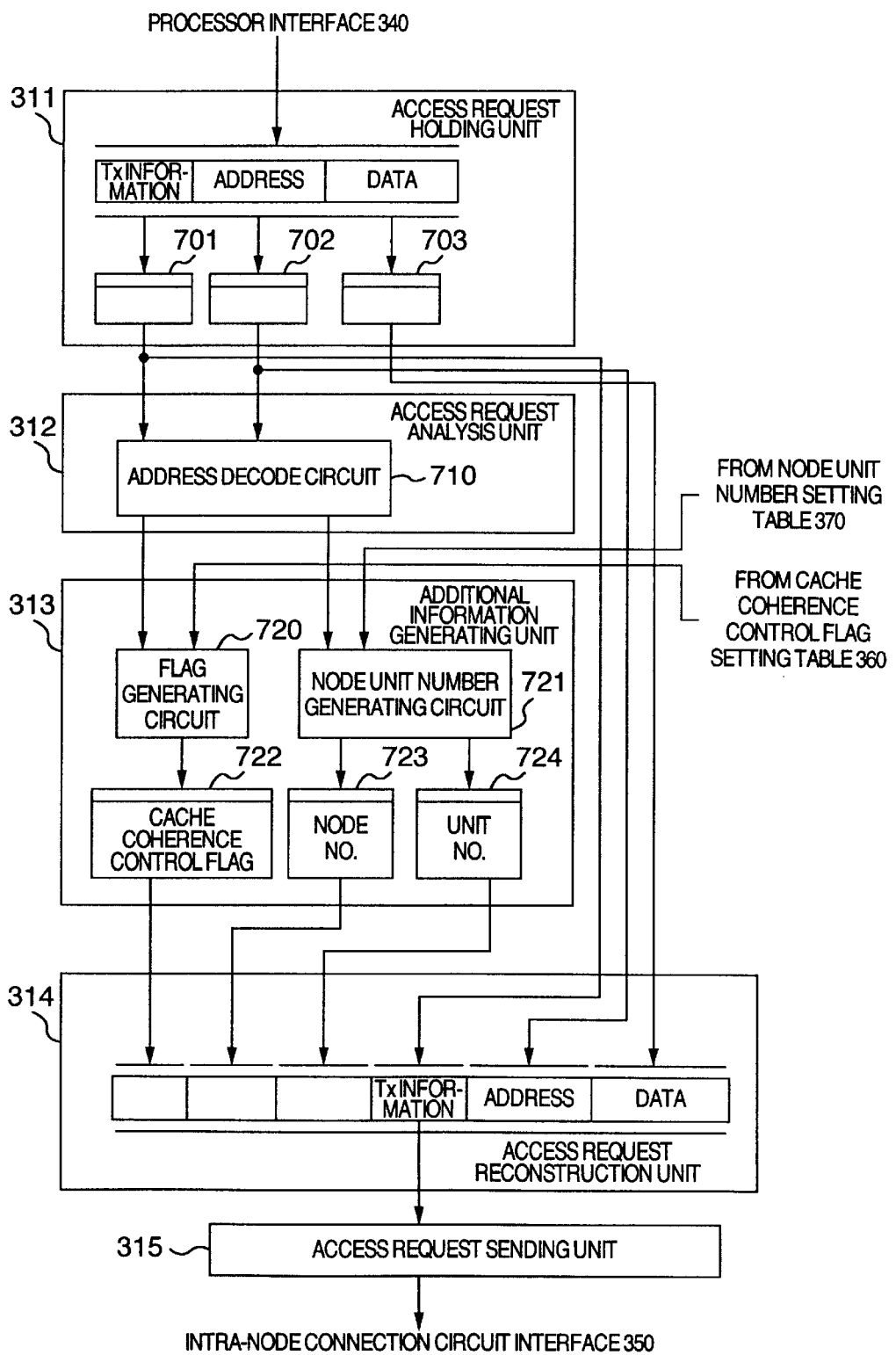
FIG. 7 is a diagram showing a configuration of an inter-unit address decode circuit according to an embodiment of the invention.

FIG. 7 shows an internal structure of the inter-unit address decode circuit 310.

The access request holding unit 311 includes registers 701, 702, 703 for holding the Tx information, the address and the data included in the access request.

The access request analysis unit 312 includes an address decode circuit 710 for decoding the Tx information and the address held in the registers 701 and 702.

The additional information generating unit 313 includes a flag generating circuit 720 for generating the cache coherence control flag using the Tx information decoded in the address decode circuit 710 and the cache coherence control flag setting table 360, a node/unit number generating circuit 721 for generating the node number and the unit number using the address decoded in the address decode circuit 710 and the node/unit number setting table 370, and registers 722, 723, 724 for holding the cache coherence control flag, the node number and the unit number thus generated, respectively.

The access request reconstruction unit 314 reconstructs the access request using the contents of the registers 722, 723, 724 of the additional information generating unit 313 and the contents of the registers 701, 702, 703 of the access request holding unit, and transmits the reconstructed access request to the access request sending unit 315.

According to this invention, novel component parts include the flag generating circuit 720 for generating the cache coherence control flag using the cache coherence control flag setting table 360 and the Tx information and the node/unit number generating circuit 721 for generating the node number and the unit number using the node/unit number setting table 370 and the address. The registers 722, 723, 724 for holding the cache coherence control flag, the node number and the unit number are also novel component parts.

The intra-unit address decode circuit 310 is configured with an access request holding unit 321, an address analysis unit 322 and an access request sending unit 323 (FIG. 4). The access request holding unit 321 holds the access request and address of the additional information transmitted thereto through the intra-node connection circuit interface 350. The address analysis unit 322 decodes the address held in the access request holding unit 321 and sends out the access request to the corresponding processor from the decoded contents. The access request sending unit 315 transfers the access request transferred thereto from the access request reconstruction unit 314 to the intra-node connection circuit 900.

The cache coherence control circuit 330 is configured with an additional information analysis unit 331 and a cache coherence control request issuing unit 332. The additional information analysis unit 331 checks the contents of the cache coherence control flag included in the additional information held in the access request holding unit 321, and in the case where the cache coherence control flag indicates that the cache coherence control is required, transmits a cache coherence control request from the cache coherence control request issuing unit 332 to the processor.

Figure 8:
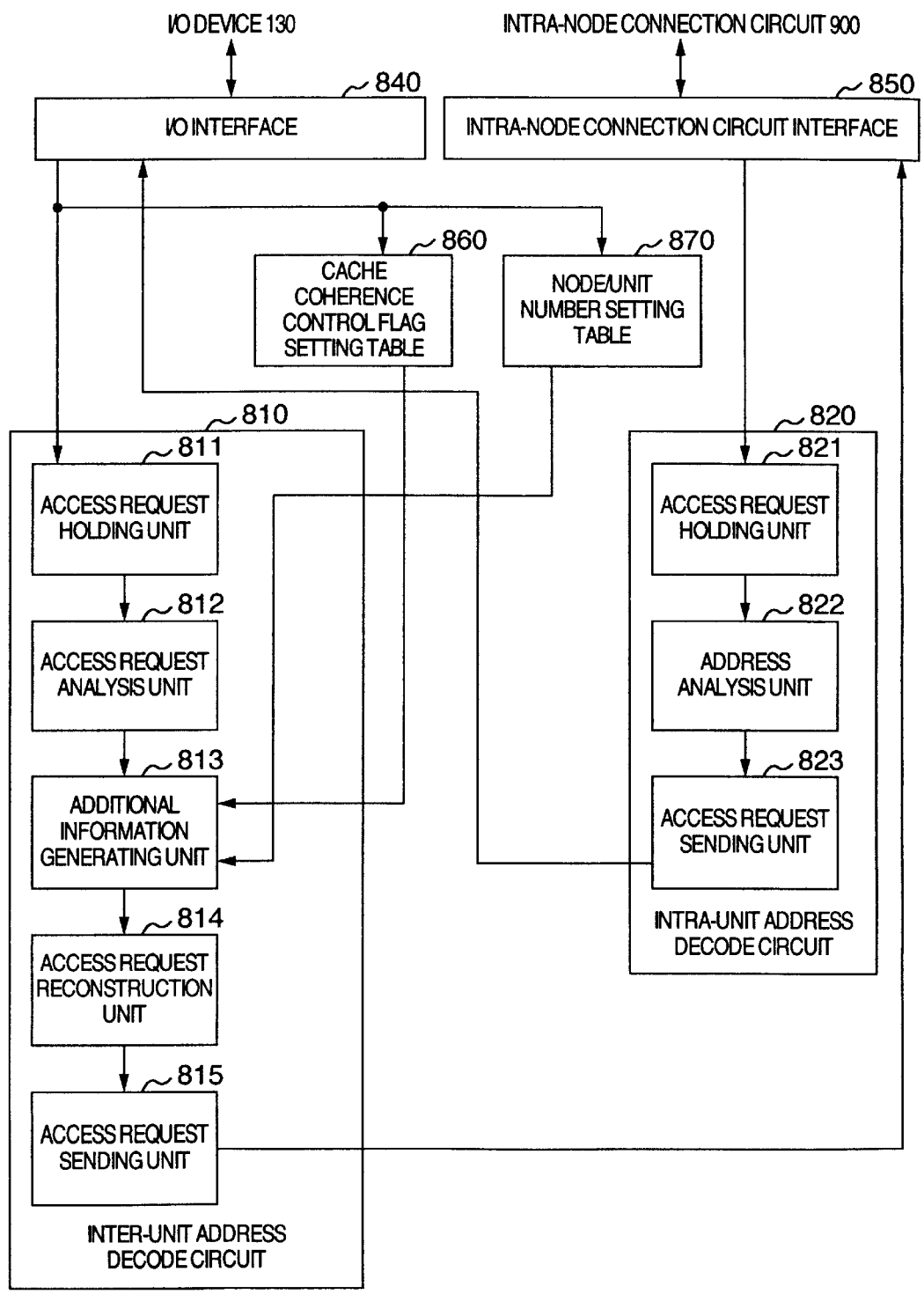
FIG. 8 is a diagram showing a configuration of an I/O unit of the node controller according to an embodiment of the invention.

Now, the configuration of the I/O unit 400 included in the node controller 150 constituting a feature of the invention will be explained with reference to FIG. 8.

The I/O unit 400 is configured with an I/O interface 840, an intra-node connection circuit interface 850, an inter-unit address decode circuit 810, an intra-unit address decode circuit 820, a cache coherence control flag setting table 360 and a node/unit number setting table 370.

The I/O unit 400 is so configured that the processor interface 340 shown in FIG. 4 is replaced by the I/O interface 840 and the cache coherence control circuit 330 is not included. The remaining configuration is the same as the corresponding configuration shown in FIG. 4 and will not be described.

According to this invention, novel component parts are the inter-unit address decode circuit 810, the cache coherence control flag setting table (i.e. the memory for setting the cache coherence control information) 860 and the node/unit number setting table (i.e. the memory for setting the node/unit number) 870 included in the I/O unit 400.

The I/O interface 840 receives an access request from the I/O device 130 and transmits the access result to the I/O device.

The configuration and operation of the inter-unit address decode circuit 810, the intra-unit address decode circuit 820, the cache coherence control flag setting table 860 and the node/unit number setting table 870 are identical to those of the inter-unit address decode circuit 310, the intra-unit address decode circuit 320, the cache coherence control flag setting table 360 and the node/unit number setting table 370, respectively, and therefore will not be described.

Figure 9:
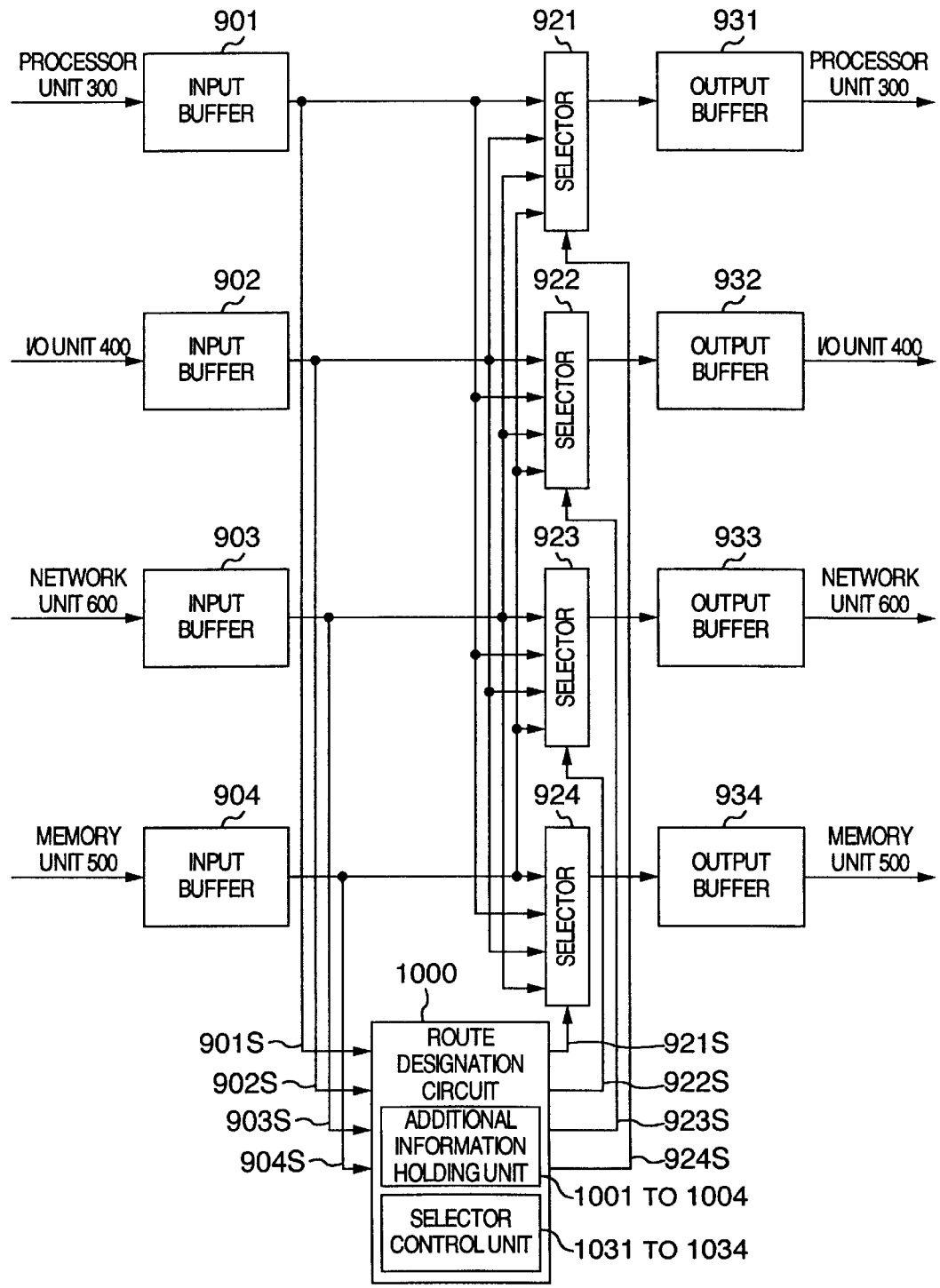
FIG. 9 is a diagram showing a configuration of an intra-node connection circuit according to an embodiment of the invention.

FIG. 9 shows a configuration of the intra-node connection circuit 900 for connecting the units to each other. The intra-node connection circuit 900 is configured with a route designation circuit 1000, selectors 921 to 924 and output buffers 931 to 934. The input buffers 901 to 904 store the access request transferred thereto from each unit. The route designation circuit 1000, of which the additional information holding units 1001 to 1003 hold the cache coherence control flag, the node number and the unit number added to the access request transferred from a given unit, selects a destination unit from the information held in the selector control units 1031 to 1034, and outputs a select signal to signal lines 921S, 922S, 923S, 924S. Selectors 921 to 924 are controlled by the signal lines 921S, 922S, 923S, 924S, select the access request transferred from a given unit, and output it to output buffers 931 to 934. The output buffers 931 to 934 hold the access request selected by the selectors 921 to 924 and output it to a given unit.

The novel feature of this invention is that the route designation circuit 1000 is controlled by the cache coherence control flag, the node number and the unit number added to the access request.

Figure 10:
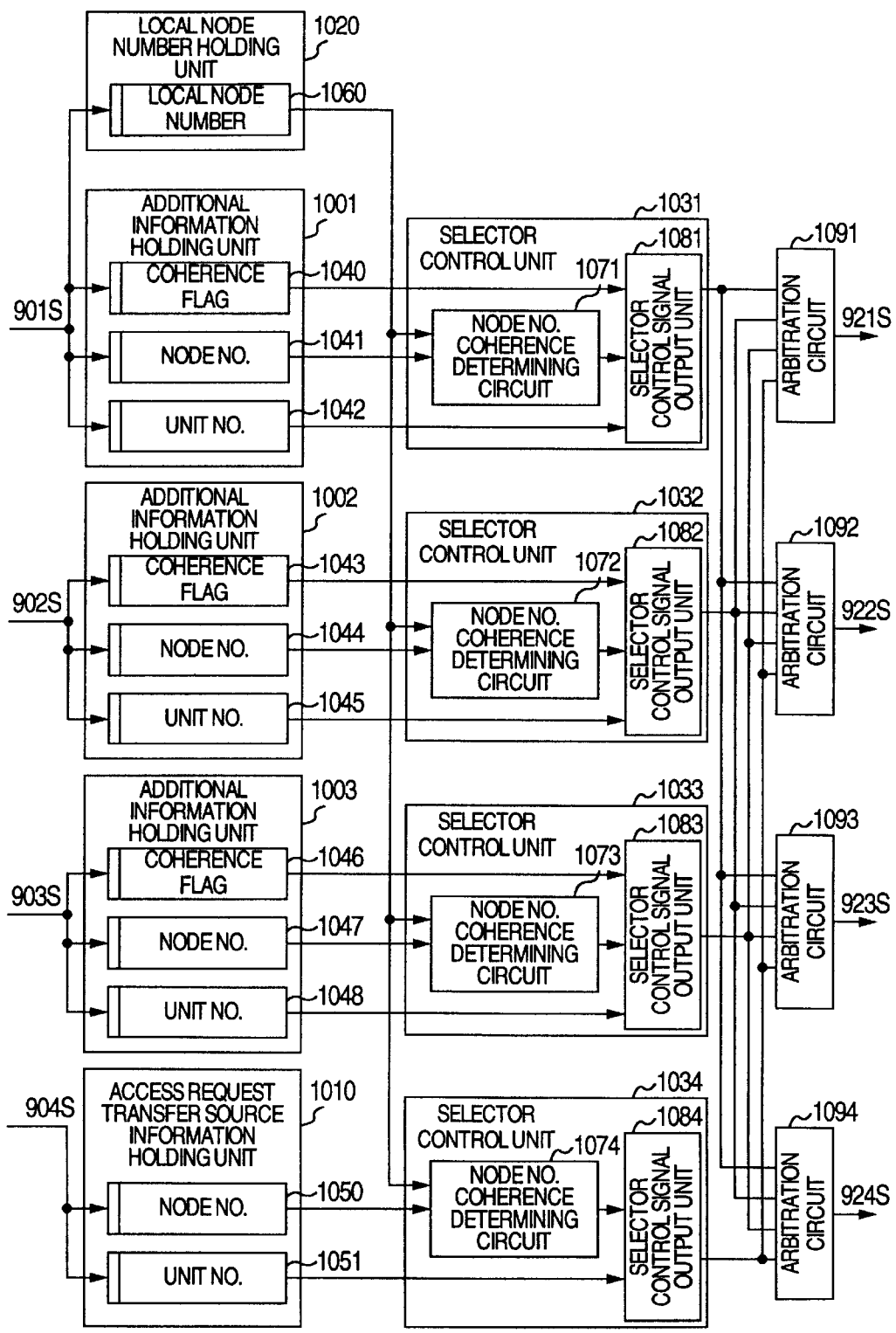
FIG. 10 is a diagram showing an internal configuration of a route designation circuit of the intra-node connection circuit according an embodiment of the invention.

The internal structure of the route designation circuit 1000 is shown in FIG. 10. The route designation circuit 1000 is configured with additional information holding units 1001 to 1003, an access request transfer source information holding unit 1010, a local node number holding unit 1020, selector control units 1031 to 1034 and arbitration circuits 1091 to 1094.

According to this invention, novel component parts are the additional information holding units 1001 to 1003 for holding the information added to the access request, the local node number holding unit 1020 for holding the local node number and the selector control units 1031 to 1034 for generating a selector control signal in accordance with the contents of the additional information, included in the route designation circuit 1000.

The additional information holding units 1001 to 1003 include registers 1040 to 1048 for holding the cache coherence control flag, the node number and the unit number added to the access request. Also, the access request source information holding unit 1010 includes registers 1050, 1051 for holding the node number and the unit number which have issued an access request to the memory unit 500. The local node number holding unit 1020 includes a register 1060 for holding the local node number. The value of the register in the local node number holding unit 1020 is set at the time of activating the system.

The selector control units 1031 to 1034 are configured node number coincidence determining circuits 1071 to 1074 and selector control signal output units 1081 to 1084.

The node number coincidence determining circuits 1071 to 1074 compare the contents held in the registers 1041, 1044, 1047, 1047 in the additional information holding units 1001 to 1003 and the register 1050 in the access request transfer source information holding unit 1010 with the contents held in the register 1060 in the local node number holding unit 102, and outputs the result of comparison to the selector control units 1081 to 1084. In the case where the node number added to the access request coincides with the local node number, a signal is output to the selector control signal output units 1081 to 1084.

The selector control signal output units 1081 to 1084 transmit a select signal to signal lines 921S to 924S based on the output result of the node number coincidence determining circuits 1071 to 1074, the value of the cache coherence control flag held in the registers 1040, 1043, 1046 and the unit number held in the register 1042, 1045, 1048, in the additional information holding units 1001 to 1003, and the contents of the register 1051 in the access request transfer source information holding unit 1010.

According to this invention, novel component parts include the selector control signal output units 1081 to 1084 for generating a select signal indicating to which unit an access request is to be transferred, using the cache coherence control flag, the node number and the unit number added to the access request.

The arbitration circuits 1091 to 1094 arbitrate a plurality of selector signals transmitted thereto from the selector control units 1031 to 1034, respectively.

FIG. 11 shows select signal output destination units corresponding to the access request transfer source units in the selector control signal output units 1081 to 1084.

As shown in FIG. 11, assume that the access request transfer source unit is the processor unit 300, the cache coherence control flag is 0 and the output of the node number coincidence determining circuit 1071 is 0. The access request is addressed to other nodes not requiring the cache coherence control, and therefore the access request is transferred to the network unit.

Assume, on the other hand, that the access request transfer source unit is the processor unit 300, the cache coherence control flag is 0 and the output of the node number coincidence determining circuit 1071 is 1. The access request is addressed to the local node not requiring the cache coherence control, and therefore the access request is transferred to the unit indicated by the unit number.

Also, assume that the access request transfer source unit is the processor unit 300, the cache coherence control flag is 1 and the output of the node number coincidence determining circuit 1071 is 0. The access request is addressed to other nodes requiring the cache coherence control, and therefore the access request is transferred to the network unit.

Again, assume that the access request transfer source unit is the processor unit 300, the cache coherence control flag is 1 and the output of the node number coincidence determining circuit 1071 is 1. The access request is addressed to the local node requiring the cache coherence control, and therefore the access request is transferred to both the network unit and the unit indicated by the unit number.

In the case where the access request transfer source unit is the I/O unit 400, the same applies as in the case where the access request transfer source unit is the processor unit.

Assume that the access request transfer source unit is the network unit 600, the cache coherence control flag is 0 and the output of the node number coincidence determining circuit 1075 is 0. The access request is addressed to other nodes not requiring the cache coherence control, and therefore the access request is not transferred.

Also, assume that the access request transfer source unit is the network unit 600, the cache coherence control flag is 0 and the output of the node number coincidence determining circuit 1075 is 1. The access request is addressed to the local node not requiring the cache coherence control, and therefore the access request is transferred to the unit indicated by the unit number.

Further, assume that the access request transfer source unit is the network unit 600, the cache coherence control flag is 1 and the output of the node number coincidence determining circuit 1075 is 0. The access request is addressed to other nodes requiring the cache coherence control, and therefore the access request is transferred to the processor unit.

Again, assume that the access request transfer source unit is the network unit 600, the cache coherence control flag is 1 and the output of the node number coincidence determining circuit 1075 is 1. The access request is addressed to the local node requiring the cache coherence control, and therefore the access request is transferred to both the processor unit and the unit indicated by the unit number.

The memory unit 500 constitutes the access request transfer source unit in the case where data is read from the memory device 140 in response to a memory access request. In the case where the output of the node number coincidence determining circuit 1076 is 1, the data read from the memory device is returned to the access request transfer source unit of the local node. In the case where the access request transfer source unit is the memory unit 500 and the output of the node number coincidence determining circuit 1076 is 0, the access request for the data read from the memory device is issued by other nodes, and the therefore the access request is transferred to the network unit.

Figure 12:
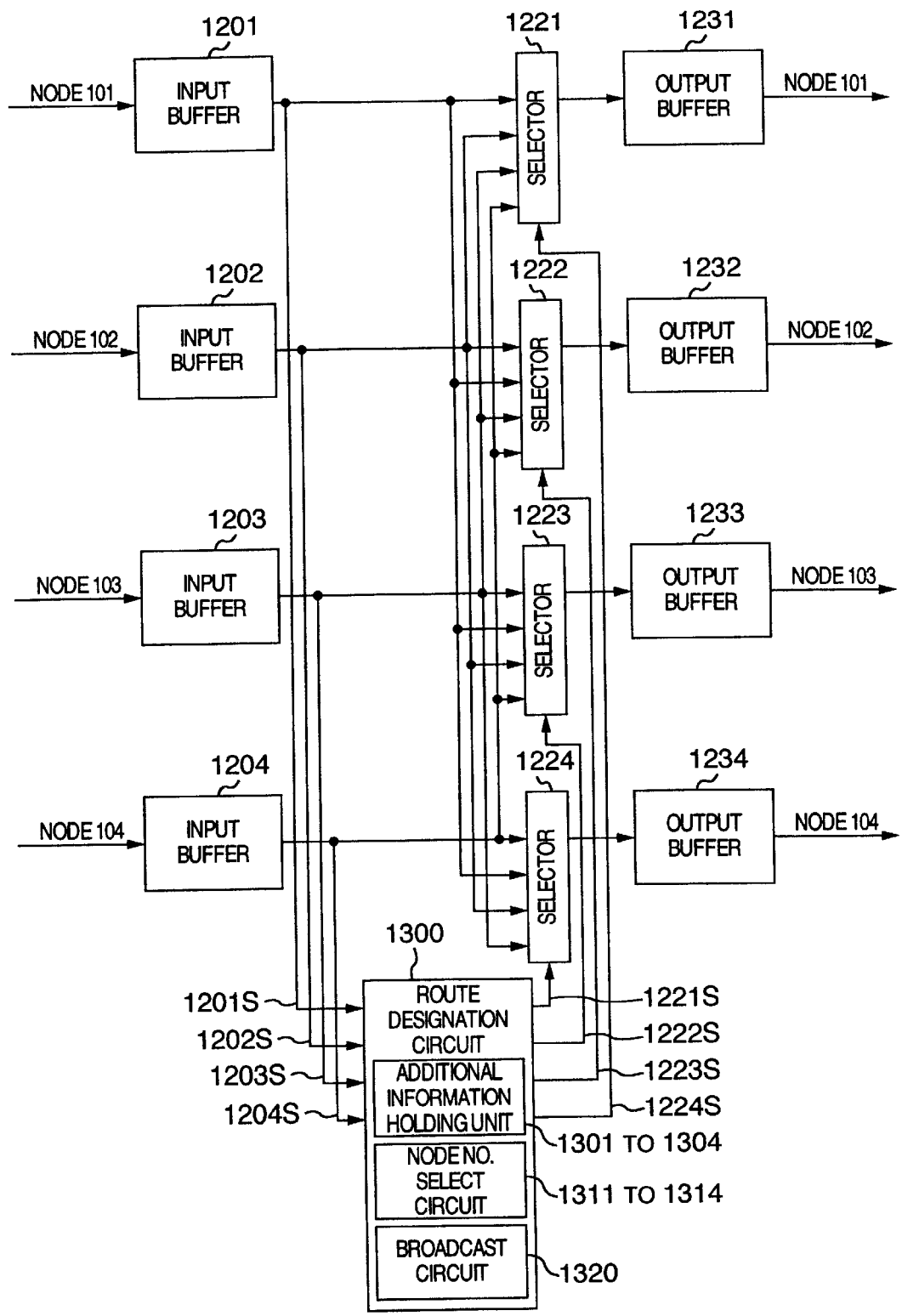
FIG. 12 is a diagram showing a configuration of an inter-node connection network according to an embodiment of the invention.

Now, a configuration of the inter-node connection network 200 will be explained. A general configuration of the inter-node connection network 200 is shown in FIG. 12. The inter-node connection network 200 shown in FIG. 12 has a similar configuration to the intra-node connection network 100 shown in FIG. 9. Since the internal configuration of the route designation circuit 1300 in the inter-node connection network 200 is different from that of the route designation circuit 1000 shown in FIG. 9, however, only the internal configuration of the route designation circuit 1300 will be explained here.

The novel feature of this invention is that the inter-node connection network 200 is controlled in accordance with the cache coherence control flag and the node number added to the access request.

Figure 13:
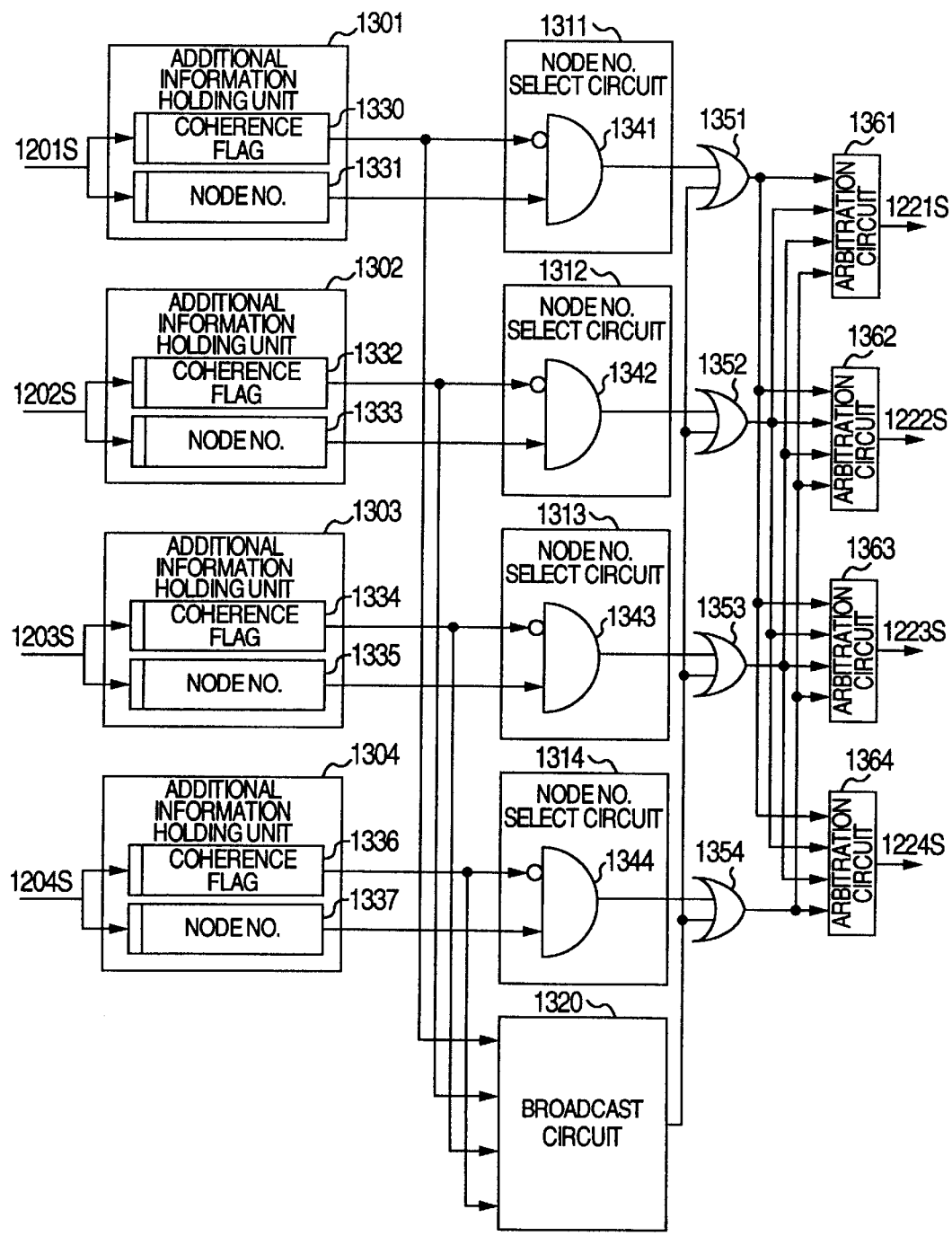
FIG. 13 is a diagram showing an internal configuration of a route designation circuit of an inter-node connection network according to an embodiment of the invention.

FIG. 13 shows the internal configuration of the route designation circuit 1300 in the inter-node connection network 200.

The route designation circuit 1300 is configured with additional information holding units 1301 to 1304, node number select circuits 1311 to 1314, a broadcast circuit 1320, OR circuits 1351 to 1354 and arbitration circuits 1361 to 1364.

According to this invention, novel component parts include the additional information holding units 1301 to 1304 for holding the information added to the access request, the node number select circuits 1311 to 1314 controlled in accordance with the contents of the cache coherence control flag and the broadcast circuit 1320.

The access request associated with the value 0 of the cache coherence control flag, i.e. the access request not requiring the cache coherence control is transferred directly to the node constituting the destination of transfer by the node number select circuits 1311 to 1314. The access request associated with the value 1 of the cache coherence control flag, i.e. the access request requiring the cache coherence control is broadcast to all the nodes.

The additional information holding units 1301 to 1304 cause the registers 1330 to 1337 to hold the cache coherence control flag and the node number added to the access request.

The node number select circuits 1311 to 1314 include AND circuits 1341 to 1344, respectively, supplied with the cache coherence control flag and the node number held in the registers 1330 to 1337 in the additional information holding units 1301 to 1304. The AND circuits 1341 to 1344 transmit an arbitration request signal to the arbitration circuit corresponding to the node number in the case where the value of the cache coherence control flag is 0.

In the case where the cache coherence control flag held in the registers 1330, 1332, 1334, 1336 in the additional information holding units 1301 to 1304 is set to 1, the broadcast circuit 1320 selects one of the registers and transmits an arbitration request signal to all the arbitration circuits.

The OR circuits 1351 to 1354 transmit the arbitration request signal from the node number select circuits 1311 to 1314 or the broadcast circuit 1320 to selected one of the arbitration circuits 1361 to 1364.

The arbitration circuits 1361 to 1364, upon receipt of the arbitration request signal from the OR circuits 1351 to 1354, arbitrate the access request and output a select signal to the signal lines 1221S to 1224S.

Now, the flow of the access request according to the invention will be explained with reference to each drawing.

By way of explanation, take the following three types of access request, as an example. (1) A read request to other nodes requiring the cache coherence control (access request 1), (2) a write request to other nodes not requiring the cache coherence control (access request 2), and (3) a read request to the local node not requiring the cache coherence control (access request 3). The flow of the access request of other types is substantially the same as the flow of the access request described above, and therefore will not be described here.

First, consider the case in which the processor 110 of the node 100 shown in FIG. 1 has issued a read request (access request 1) requiring the cache coherence control to the address C1. The address C1 designates the address space of the node 103, and therefore the request 1 is a read request to other nodes requiring the cache coherence control. Assume that the data of the address C1 is not cached in the cache of the processor 110. Also assume that each node has a serial physical number. For example, assume that the node 100 is 0, the node 101 is 1, the node 102 is 2 and the node 103 is 3. Further, each unit in the node also has a serial physical number, and assume that the processor unit 300 is 0, the memory unit 500 is 1, the I/O unit 400 is 2 and the network 600 is 3.

The access request 1 issued by the processor 110 is transferred to the node controller 150 through the processor bus 120. The node controller 150 sends the access request 1 to the inter-unit address decode circuit 310 through the processor interface 340 shown in FIG. 4.

The inter-unit address decode circuit 310 is such that the access request holding unit 311 shown in FIG. 7 causes the registers 701, 702 to hold the Tx information and the address of the access request 1. The access request 1 is a read request and therefore the register 703 holds nothing.

The access request analysis unit 312 causes the address decode circuit 710 to decode the Tx information and the address held in the registers 701, 702, and transfers the result of decoding to the additional information generating unit 313.

The additional information generating unit 313 causes a flag generating circuit 720 to generate a cache coherence control flag from the decoded Tx information and a preset cache coherence control flag setting table 360, and holds the cache coherence control flag this generated in the register 722. The access request 1 is a read request requiring the cache coherence control, and therefore the Tx information is Type 1 as seen from FIG. 3C. Further, as seen from FIG. 5, the cache coherence control flag for the access request of Type 1 is set to 1, and therefore 1 is held in the register 722. Further, the additional information generating unit 313 causes a node/unit number generating circuit 721 to generate the node number and the unit number of the access request transfer destination from the decoded address and the preset node/unit number setting table 370, and holds them in the registers 723, 724. The address of the access request 1 is C1, and therefore from FIG. 6, the node number is 3 and the unit number is 1, so that 3 and 1 are held in the registers 723 and 724, respectively.

The access request reconstruction unit 314 reconstructs the access request using the contents held in the registers 722, 723, 724 and the registers 701, 702. In the access request reconstruction unit 314, the information including the cache coherence control flag 1, the node number 3 and the unit number 1 is added to the access request 1. The access request carrying the additional information is transferred to the intra-node connection circuit 900.

As shown in FIG. 9, the intra-node connection circuit 900 holds the access request 1 transferred from the processor unit 300 in an input buffer 901. The registers 1040 to 1042 of the additional information holding unit 1001 in the route designation circuit 1000 hold the cache coherence control flag, the node number and the unit number, respectively, added to the access request 1. The selector control unit 1031 causes the node number coincidence determining circuit 1071 to compare the local node number with the node number held in the register 1041. The local node number is 0, and the node number held in the register 1041 is 3. Therefore, the result of comparison is non-coincidence (0). The selector control signal output unit 1081 determines to which unit the access request 1 is to be transferred, based on the cache coherence control flag held in the register 1040, the result of comparison in the node number coincidence determining circuit 1071 and the unit number held in the register 1042. The correspondence table of FIG. 1 indicates that the access request transfer source unit is the processor unit, the cache coherence control flag is 1 and the output of the node number coincidence determining circuit 1071 is 0. Therefore, the access request 1 is transferred to the network unit 600. The network unit 600 sends out the access request 1 to the inter-node connection network 200.

As shown in FIG. 12, the inter-node connection network 200 transfers the access request 1 to the appropriate node in response to an instruction from the route designation circuit 1300. As shown in FIG. 13, the registers 1330, 1331 in the additional information holding unit 1301 of the route designation circuit 1300 hold the cache coherence control flag and the node number added to the access request 1. The registers 1330, 1331 hold 1 and 3, respectively. The value of the register 1330 is 1, and therefore the node number select circuit 1311 is not activated, while the broadcast circuit 1320 is activated. The broadcast circuit 1320 sends out an arbitration request signal to all the arbitration circuits 1361 to 1364, with the result that all the selectors shown in FIG. 12 output the access request 1 from the node 100 to all the nodes connected to the inter-node connection network 200.

The access request 1 is transferred to the nodes 100, 101, 102, 103.

Now, an explanation will be given of the flow of the access request that has been transferred to the nodes 101 and 103. First, reference is had to the flow of the access request 1 that has been transferred to the node 101. As shown in FIG. 1, the intra-node access request 1 is transferred to the intra-node connection circuit 900 through the network unit 600.

The intra-node connection circuit 900 holds the access request 1 in the input buffer 903. The route designation circuit 1000 holds the cache coherence control flag, the node number and the unit number in the registers 1046 to 1048, respectively, in the additional information holding unit 1003. In the process, the registers 1046, 1047, 1048 hold 1, 3, 1, respectively. The node number coincidence determining circuit 1073 of the selector control unit 1033 compares the local node number with the node number held in the register 1047.

The local node number is 1 and the node number held in the register 1041 is 3. Therefore, the result of comparison is non-coincidence (0). The selector control signal output unit 1083 determines to which unit the access request 1 is to be transferred, based on the cache coherence control flag held in the register 1046, the result of comparison of the node number coincidence determining circuit 1073 and the unit number held in the register 1048. From the correspondence table of FIG. 11, the access request transfer source unit is seen to be the network unit, the cache coherence control flag 1 and the output 0 of the node number coincidence determining circuit. Thus, the access request 1 is transferred to the processor unit.

The processor unit 300 shown in FIG. 4 transfers the access request 1 to the intra-unit address decode circuit 320 and the cache coherence control circuit 330. The cache coherence control flag added to the access request 1 is 1. Therefore, the cache coherence control circuit 330 issues a cache coherence control request to the processor and performs the cache coherence control. The method of the cache coherence control is the same as in the prior art and therefore will not be described.

Now, the flow of the access request 1 transferred to the node 103 will be explained. As shown in FIG. 1, the access request 1 is transferred to the intra-node connection circuit 900 through the network unit 600. The intra-node connection circuit 900 holds the access request 1 in the input buffer 903. The route designation circuit 1000 holds the cache coherence control flag, the node number and the unit number in the registers 1046 to 1048, respectively, in the additional information holding unit 1003. The cache coherence control flag, the node number and the unit number are 1, 3 and 1, respectively. Therefore, the registers 1046, 1047 and 1048 hold 1, 3 and 1, respectively. The node number coincidence determining circuit 1073 of the selector control unit 1033 compares the local node number with the node number held in the register 1047. The local node number is 3, and the node number held in the register 1041 is 3. Therefore, the result of comparison is coincidence (1). This indicates the access request to the local node. The selector control signal output unit 1083 determines to which unit the access request 1 is to be transferred, based on the cache coherence control flag held in the register 1046, the result of comparison in the node number coincidence determining circuit 1073 and the unit number held in the register 1048. The correspondence table of FIG. 11 shows that the access request transfer source unit is the network unit, the cache coherence control flag is 1, and the output of the node number coincidence determining circuit is 1. Thus, the access request 1 is transferred to the processor unit and the unit (memory unit) indicated by the unit number.

The processor unit 300 shown in FIG. 4 transfers the access request 1 to the intra-unit address decode circuit 320 and the cache coherence control circuit 330. In view of the fact that the cache coherence control flag added to the access request 1 is 1, the cache coherence control circuit 330 issues a cache coherence control request to the processor and performs the cache coherence control.

The memory unit 500 reads the data from the memory device 140 in accordance with the address of the access request 1. The data thus read is returned to the node 100 as an answer to the access request 1.

Now, an explanation will be given of the case in which the processor 110 of the node 100 has issued a write request not requiring the cache coherence control (access request 2) to the address C1. The address C1 is an address space of the node 103, and therefore the access request 2 also constitutes an access to other nodes. It is assumed that the data of the address C1 is not cached in the cache of the processor 110. Also, assume that each node has a serial physical number, i.e. 0 for the node 100, 1 for the node 101, 2 for the node 102 and 3 for the node 103. Further, the units in each node also have serial physical numbers, i.e. 0 for the processor unit, 1 for the memory unit, 2 for the I/O unit and 3 for the network unit.

The access request 2 issued by the processor 110 is transferred to the node controller 150 through the processor bus 120. The node controller 150 transfers the access request 2 to the inter-unit address decode circuit 310 through the processor interface 340 shown in FIG. 4.

The inter-unit address decode circuit 310 holds the Tx information, the address and the data of the access request 2 in the registers 701, 702, 703 of the access request holding unit 311 shown in FIG. 7.

The access request analysis unit 312 decodes the Tx information and the address held in the registers 701, 702 by the address decode circuit 710 and transfers the result of decoding to the additional information generating unit 313.

The flag generating circuit 720 of the additional information generating unit 313 generates a cache coherence control flag from the decoded Tx information and the preset cache coherence control flag setting table 360 and holds the cache coherence control flag in the register 722. The Tx information of the access request 2 is Type 4 (FIG. 3C), and therefore 0 is set in the cache coherence control flag (FIG. 5) and held in the register 722. Further, the additional information generating unit 313 generates the node number and the unit number of the access request transfer destination from the address decoded by the node/unit number generating circuit 721 and the preset node/unit number setting table 370, and holds them in the registers 723, 724. The address of the access request 2 is C1. Therefore, from the node/unit number setting table shown in FIG. 6, the node number is 3 and the unit number is 1. Thus, the node number is 3 and the unit number is 1, which are held in the registers 723 and 724, respectively.

The access request reconstruction unit 314 reconstructs the access request 2 using the contents held in the registers 722, 723, 724 and the registers 701, 702, 703. In the access request reconstruction unit 314, the information including the cache coherence control flag 0, the node number 3 and the unit number 1 are added to the access request 2. The access request 2 carrying the additional information is transferred to the intra-node connection circuit 900.

As shown in FIG. 9, the intra-node connection circuit 900 holds the access request 2 transferred from the processor unit 300, in the input buffer 901. The route designation circuit 1000 shown in FIG. 10 holds the cache coherence control flag, the node number and the unit number added to the access request 2, in the registers 1040 to 1042, respectively, of the additional information holding unit 1001. The registers 1040, 1041, 1042 hold 0, 3, 1, respectively. The selector control unit 1031 compares the local node number with the node number held in the register 1041, in the node number coincidence determining circuit 1071. The local node number is 0, and the node number held in the register 1041 is 3. Therefore, the result of comparison is non-coincidence (0). The selector control signal output unit 1081 determines to which unit the access request 2 is to be transferred, based on the cache coherence control flag held in the register 1040, the result of comparison in the node number coincidence determining circuit 1071 and the unit number held in the register 1042. The correspondence table of FIG. 11 shows that the access request transfer source unit is the processor unit, the cache coherence control flag is 0, and the output of the node number coincidence determining circuit 1071 is 0. Thus, the access request 2 is transferred to the network unit 600. The network unit 600 sends out the access request 2 to the inter-node connection network 200.

The inter-node connection network 200 shown in FIG. 12 transfers the access request 2 to a corresponding node in response to an instruction from the route designation circuit 1300. As shown in FIG. 13, the registers 1330, 1331 in the additional information holding unit 1301 of the route designation circuit 1300 hold the cache coherence control flag and the node number added to the access request 2. The values held in the registers 1330 and 1331 are 0 and 3, respectively. Since the value of the register 1330 is 0, the node number select circuit 1311 is activated. The node number select circuit 1311 sends out an arbitration request signal to the arbitration circuit 1364. As a result, the selector 1224 shown in FIG. 12 outputs the access request 2 from the node 100 to the node 103.

Now, the flow of the access request 2 transferred to the node 103 will be explained.

As shown in FIG. 1, the access request 2 is transferred to the intra-node connection circuit 900 through the network unit 600. The intra-node connection circuit 900 holds the access request 2 in the input buffer 903. The route designation circuit 1000 shown in FIG. 10 holds the cache coherence control flag, the node number and the unit number in the registers 1046 to 1048, respectively, in the additional information holding unit 1003. The cache coherence control flag, the node number and the unit number are 0, 3 and 1, respectively. Thus the registers 1046, 1047 and 1048 hold 0, 3 and 1, respectively. The selector control unit 1033 compares the local node number with the node number held in the register 1047, in the node number coincidence determining circuit 1073. The local node number is 3, and the node number held in the register 1041 is 3. Thus, the result of comparison is coincidence (1). The selector control signal output unit 1083 determines to which unit the access request 2 is to be transferred, based on the cache coherence control flag held in the register 1046, the result of comparison in the node number coincidence determining circuit 1073 and the unit number held in the register 1048. The correspondence table of FIG. 11 shows that the access request transfer source unit is the network unit, the cache coherence control flag is 0 and the output of the node number coincidence determining circuit is 1. Therefore, the access request 2 is transferred to only the unit indicated by the unit number. The unit number is 1, and therefore the access request 2 is transferred to the memory unit 500. The memory unit 500 ends the process by writing data in the memory 140 in accordance with the address in the access request 2.

Now, reference is made to the case where a read request (hereinafter called the access request 3) not requiring the cache coherence control is issued to the address 02 by the processor 110 of the node 100 shown in FIG. 1. The address 02 is the address space of the node 100, and therefore the access request 3 constitutes an access to the local node. It is assumed that the data of the address 02 is not cached in the cache of the processor 110.

The access request 3 that has been issued by the processor 110 is transferred to the node controller 150 through the processor bus 120. The node controller 150 transfers the access request 3 to the inter-unit address decode circuit 310 through the processor interface 340 shown in FIG. 4.

The inter-unit address decode circuit 310 holds the Tx information and the address of the access request 3 in the registers 701, 702 of the access request holding unit 311 shown in FIG. 7.

The Tx information and the address held in the registers 701, 702 are decoded by the address decode circuit 710 of the access request analysis unit 312, and the result of decoding is transferred to the additional information generating unit 313.

The flag generating circuit 720 of the additional information generating unit 313 generates the cache coherence control flag from the decoded Tx information and the preset cache coherence control flag setting table 360, and the flag thus generated is held in the register 722. The Tx information of the access request 3 is Type 3 (FIG. 3C), and therefore the cache coherence control flag (FIG. 5) is set to 0, and 0 is held in the register 722. Further, the node/unit number generating circuit 712 of the additional information generating unit 313 generates the node number and the unit number of the access request transfer destination based on the address decoded in the node/unit number generating circuit 721 and the preset node/unit number setting table 370. These information are held in the registers 723, 724. The address of the access request 3 is 02. Thus, the node number 0 and the unit number is 1 as seen from the node/unit number setting table shown in FIG. 6, so that 0 and 1 are held in the registers 723, 724, respectively.

The access request reconstruction unit 314 reconstructs the access request 3 using the contents held in the registers 722, 723, 724 and the registers 701, 702. In the access request reconstruction unit 314, the information including the cache coherence control flag 1, the node number 0 and the unit number 1 are added to the access request 3. The access request 3 carrying the additional information is transferred to the intra-node connection circuit 900.

As shown in FIG. 9, the intra-node connection circuit 900 holds the access request 3 transferred from the processor unit 300, in the input buffer 901. The route designation circuit 1000 shown in FIG. 10 holds the cache coherence control flag, the node number and the unit number added to the access request 3, in the registers 1040 to 1042, respectively, of the additional information holding unit 1001. The registers 1040, 1041, 1042 hold 0, 0, 1, respectively. The selector control unit 1031 compares the local node number with the node number held in the register 1041, in the node number coincidence determining circuit 1071. The local node number is 0, and the node number held in the register 1041 is 0. Therefore, the result of comparison is coincidence (1). The selector control signal output unit 1081 determines to which unit the access request 3 is to be transferred, based on the cache coherence control flag held in the register 1040, the result of comparison in the node number coincidence determining circuit 1071 and the unit number held in the register 1042. The correspondence table of FIG. 11 shows that the access request transfer source unit is the processor unit, the cache coherence control flag is 0, and the output of the node number coincidence determining circuit 1071 is 1. Thus, the access request 3 is transferred to the unit indicated by the unit number 1, i.e. the memory unit 500 in the case under consideration. The memory unit 500 reads the data from the memory device 140 in accordance with the address of the access request 3 transferred thereto, and returns the data thus read to the processor 110.

As described above, in the node controller according to this embodiment, the information including the flag indicating whether the cache coherence control is required or not, the node number and the unit number of the transfer destination are added to the access request, and the inter-node connection network connecting a plurality of nodes is controlled using the particular information. Thus access request not requiring the cache coherence control can be transferred directly only to the node designated by the node number without being broadcast to all the nodes connected to the inter-node connection network. As a result, the load on the inter-node connection network can be reduced and the operating efficiency of the same network can be improved.

Also, the intra-node connection circuit connecting the units in the node can be controlled by the node controller based on the information added to the access request. Thus, the access request to the memory device and the I/O device in the local node not requiring the cache coherence control can be transferred directly only to the unit indicated by the unit number, without being transferred to the inter-node connection network or without being broadcast to all the units connected to the intra-node connection circuit. As a result, not only the load on the inter-node connection network can be reduced and the operating efficiency thereof improved but also the load on the intra-node connection circuit can be reduced.

The embodiments of the invention have been described above.

In a modification of the invention, the nodes 100 to 103 have different configurations from each other. Specifically, each node is configured with a processor having a cache memory, and at least one of a memory device and an I/O device, wherein at least one node is configured with a processor and at least one of a memory device and an I/O device, and wherein the whole of a plurality of nodes have at least one processor, at least one memory device and at least one I/O device.

For example, the nodes 100 and 101 each may include the processors 110 to 113, the I/O device 130 and the memory 140; the node 102 may include only the memory device 140; and the node 103 may include the processors 110 to 113 and the I/O device 130.

In this case, the nodes 100 and 101 each have the same configuration as the node 100 in FIG. 1. Also, since the node 102 lacks the processor and the I/O device, the node controller 150 shown in FIG. 1 is configured free of the processor 300 and the I/O unit 400. Further, since the node 103 lacks the memory device, the node controller 150 in FIG. 1 has a configuration free of the memory unit 500. In the case where a node is configured only with the I/O device 130, the node controller 150 shown in FIG. 1 is configured free of the processor unit 300 and the memory unit 500.

In the case where the nodes have different configurations, the access request is not required to be transferred to the nodes not requiring the cache coherence control. For this reason, a memory such as a multicast table 1400 is arranged in the broadcast circuit 132 of the route designation circuit 1300 of the inter-node connection network 200.

An example of a configuration of the multicast table 1400 is shown in FIG. 14. The information in the multicast table 1400 is set by the node which becomes a host at the time of starting the system, and the information as to whether the cache coherence control is required or not is recorded for each node. In the case where a node includes a processor having a cache memory, the cache coherence control is required for the node, while the cache coherence control is not required for a node free of the processor having a cache memory. In the example shown in FIG. 14, therefore, the data "1" indicating that the cache coherence control is required is recorded for the nodes 100, 101, 102, while the data "0" indicating that the cache coherence control is not required is recorded for the node 102.

In the route designation circuit 1300, the broadcast circuit 1320 is activated in the case where the cache coherence control flag added to the access request indicates that the cache coherence control is required. The broadcast circuit 1320 outputs an arbitration request signal in such a manner as to transfer the access request only to the nodes requiring the cache coherence control in accordance with the information in the multicast table 1400. Specifically, in the case where the cache coherence control information indicates that the cache coherence control is required, the access request is transferred to those nodes having a cache memory among a plurality of the nodes which the information of the multicast table 1400 indicates require the cache coherence control, while in the case where the cache coherence control information indicates that the cache coherence control is not required, the access request is transferred only to the node indicated by the node information added to the access request.

In this way, that access request issued by the processor or the I/O device which requires the cache coherence control is broadcast to all the nodes requiring the cache coherence control, while the access request not requiring the cache coherence control is transferred only to the nodes designated as a destination.

According to another modification of the invention, the inter-unit address code circuits 310, 420 are arranged in the intra-node connection circuit 900 but not in the processor unit 300 and the I/O unit 400. The processor unit 300 and the I/O unit 400 transfer the access request issued by the processor and the I/O device to the intra-node connection circuit 900. The inter-node connection circuit 900 decodes the control information and address information of the transferred access request, generates a cache coherence control flag, a node number and a unit number, reconstructs the access request, and transfers it to the unit designated by the route designation circuit 1000.

As described above, according to this embodiment, the access request not requiring the cache coherence control can be transferred directly only to a specific node without being broadcast to all the nodes connected to the inter-node connection network, and therefore the load of the inter-node connection network is reduced with an improved operating efficiency.

Also, an access request not requiring the cache coherence control for the units in the local node can be transferred only to the units involved in the local node without being transferred to the inter-node connection network. As a result, the load on the inter-node connection network is reduced for an improved operating efficiency on the one hand, and the load of the intra-node connection circuit can be reduced at the same time.

What is claimed is:

1. A shared memory multiprocessor comprising:
   a plurality of nodes each configured with at least one of a processor having a cache memory, a memory device and an I/O device, and a node controller; and
   an inter-node connection network for interconnecting a plurality of said nodes;
   wherein at least one of a plurality of said nodes includes said processor and at least one of said memory device and said I/O device, and the whole of a plurality of said nodes include at least one said processor, at least one said memory device and at least one said I/O device;
   wherein said node controller of each of a plurality of said nodes includes a processor unit constituting an interface with said processor in a local node, at least a memory unit constituting an interface with said memory device in the local node and an I/O unit constituting an interface with said I/O device in the local node, a network unit constituting an interface with said inter-node connection network, and an intra-node connection circuit for connecting said processor unit and at least one of said memory device and said I/O device to said inter-node connection network unit;

wherein said processor unit includes an inter-unit address decode circuit and a cache coherence control circuit, said inter-unit address decode circuit decoding the control information and the address information in a memory access request or an I/O access request issued by the processor in the local node, and adding to said access request the information on the node associated with the memory unit or the I/O unit intended as a destination of said access request, the information on the unit intended as a destination of said access request, and the cache coherence control information indicating whether the cache coherence control is required or not, said cache coherence control circuit performing the cache coherence control of the processor in the local node in the case where the cache coherence control information added to the access request received from said network unit indicates that the cache coherence control is required;

wherein said I/O unit includes an inter-unit address decode circuit whereby the node information and the unit information for the memory unit or the I/O unit intended as a access request destination and the cache coherence control information indicating whether the cache coherence control is required or not are added to the memory access request or the I/O access request issued by the I/O device in the local node;

wherein said network unit includes a transfer unit for transferring the access request received from said intra-node connection circuit to said inter-node connection network, and a transfer unit for transferring the access request transferred thereto from said inter-node connection network to said intra-node connection network;

wherein said intra-node connection circuit transfers said access request to the unit in the local node designated as a destination of transfer based on the cache coherence control information, the node information and the unit information added to the access request transferred from said inter-node connection network through said network unit; and wherein said inter-node connection network transfers said access request to the node designated by the cache coherence control information and the node information added to the access request received from said network unit.

2. A shared memory multiprocessor according to claim 1, wherein each of a plurality of said nodes operates in such a manner that:

in the case where the node information added to the access request issued by the processor of said local node indicates the access to said local node and said cache coherence control information indicates that the cache coherence control is required, then said access request is broadcast to all the nodes requiring the cache coherence control through said inter-node connection network; and in the case where the node information added to the access request issued by the processor of said local node indicates the access to said local node and said cache coherence control information added to said access request indicates that the cache coherence control is not required, then said access request is not output to said inter-node connection network but directly transferred to the unit in said local node designated by the unit information added to said access request from said intra-node connection circuit.

3. A shared memory multiprocessor according to claim 1, wherein each of a plurality of said nodes operates in such a manner that:

in the case where the node information added to the access request issued by the I/O device of said local node indicates the access to said local node and said cache coherence control information indicates that the cache coherence control is required, then said access request is broadcast to all the nodes requiring the cache coherence control through said inter-node connection network; and in the case where the node information added to the access request issued by the I/O device of said local node indicates the access to said local node and said cache coherence control information added to said access request indicates that the cache coherence control is not required, then said access request is not output to said inter-node connection network but directly transferred to the unit in said local node designated by the unit information added to said access request from said intra-node connection circuit.

4. A shared memory multiprocessor according to claim 1, wherein said processor unit and said I/O unit each include an information setting table for setting said cache coherence control information added to said access request, a node/unit information setting table for setting said node information and said unit information added to said access request, a holding unit for generating and holding said cache coherence control information, said node information and said unit information added to said access request, based on said information setting table and said node/unit information setting table, and a reconstruction unit for reconstructing said access request using said cache coherence control information, said node information and said unit information.

5. A shared memory multiprocessor according to claim 1, wherein said inter-node connection network includes a first crossbar switch for transferring the address section of the access request issued by said processor, said I/O device or said memory, and a second crossbar switch for transferring the data section of said access request.

6. A shared memory multiprocessor comprising:

a plurality of nodes each configured with at least one of a processor having a cache memory, a memory device and an I/O device, and a node controller; and an inter-node connection network for interconnecting a plurality of said nodes;

wherein at least one of a plurality of said nodes includes said processor and at least one each of said memory device and said I/O device, and the whole of a plurality of said nodes include at least one said processor, at least one said memory device and at least one said I/O device;

wherein said node controller of each of a plurality of said nodes includes a processor unit constituting an interface with said processor in the local node, a memory unit constituting an interface with said memory device in the local node and/or an I/O unit constituting an interface with said I/O device in the local node, a network unit constituting an interface with said inter-node connection network, and an intra-node connection circuit for connecting said processor unit, at least one of said memory device and said I/O device, and said network unit;

wherein said processor unit includes an inter-unit address decode circuit and a cache coherence control circuit, said inter-unit address decode circuit decoding the control information and the address information in said access request, and operating in such a manner that the information on the node associated with the memory unit or the I/O unit intended as an access request destination, the information on the unit intended as an access request destination, and the cache coherence control information indicating whether the cache coherence control is required or not, are added to a memory access request or an I/O access request issued by the processor in the local node, said cache coherence control unit performing the cache coherence control of the processor in the local node in the case where the cache coherence control information added to the access request received from said network unit indicates that the cache coherence control is required,;

wherein said I/O unit includes an inter-unit address decode circuit for adding the node information and the unit information for the memory unit or the I/O unit intended as an access request destination and the cache coherence control information indicating whether the cache coherence control is required or not, to the memory access request or the I/O access request issued by the I/O device in the local node;

wherein said network unit includes a transfer unit for transferring the access request received from said intra-node connection circuit to said inter-node connection network, and a transfer unit for transferring the access request transferred thereto from said inter-node connection network to said intra-node connection network;

wherein said intra-node connection circuit operates in such a manner that in the case where a unit in the local node is designated as the destination of transfer based on the cache coherence control information, the node information and the unit information added to the access request transferred from said inter-node connection network through said network unit, said access request is transferred to the unit designated as the transfer destination;

wherein said intra-node connection circuit includes a unit designation circuit for designating the destination of transfer of said access request based on the cache coherence control information, the node information and the unit information added to the access request transferred from said inter-node connection network, and a transfer unit for transferring said access request to the unit connected to said intra-node connection circuit in response to the designation of said unit designation circuit;

wherein said inter-node connection network includes a node designation circuit for designating the destination of transfer of said access request based on the cache coherence control information, the node information and the unit information added to the access request sent out from said network unit, and a transfer unit for transferring said access request in response to the designation of said node designation circuit; and wherein that access request issued by said processor or said I/O device which requires the cache coherence control is broadcast to all the nodes requiring the cache coherence control, while the access request not requiring the cache coherence control is transferred only to the node intended as a destination.

7. A shared memory multiprocessor according to claim 6, wherein said node designation circuit includes a holding unit for holding the cache coherence control information and the node information added to the access request sent out from said network unit, a control signal generating unit for generating a control signal for broadcasting said access request to a plurality of nodes connected to said inter-node connection network in the case where said cache coherence control information added to said access request indicates that the cache coherence control is required, and a control signal generating unit for generating a control signal for transferring said access request only to the node indicated by said node information in the case where said cache coherence control information added to said access request indicates that the cache coherence control is not required.

8. A shared memory multiprocessor according to claim 6, wherein said node designation circuit includes a setting unit for setting the information indicating whether the cache coherence control is required or not for each of a plurality of the nodes connected to said inter-node connection network, and even an access request requiring the cache coherence control is not transferred to the node not requiring the cache coherence control as designated by said information set in said setting unit.

9. A node controller included in each node of a shared memory multiprocessor comprising a plurality of nodes each configured with at least one of a processor having a cache memory, a memory device and an I/O device, and a node controller, and an inter-node connection network for interconnecting a plurality of said nodes;

wherein at least one of a plurality of said nodes includes said processor and at least one each of said memory device and said I/O device, and the whole of a plurality of said nodes include at least one said processor, at least one said memory device and at least one said I/O device;

wherein said node controller of each of a plurality of said nodes includes a processor unit constituting an interface with said processor in the local node, at least one of a memory unit constituting an interface with said memory device in the local node and an I/O unit constituting an interface with said I/O device in the local node, a network unit constituting an interface with said inter-node connection network, and an intra-node connection circuit for connecting said processor unit, at least one of said memory device and said I/O device, and said network unit to each other;

wherein said processor unit includes an inter-unit address decode circuit and a cache coherence control circuit, said inter-unit address decode circuit decoding the control information and the address information in said access request, and operating in such a manner that the information on the node associated with the memory unit or the I/O unit intended as an access request destination, the information on the unit intended as an access request destination, and the cache coherence control information indicating whether the cache coherence control is required or not, are added to a memory access request or an I/O access request issued by the processor in the local node said cache coherence control circuit performing the cache coherence control of the processor in the local node in the case where said cache coherence control information added to the access request received from said network unit indicates that the cache coherence control is required;

wherein said I/O unit includes an inter-unit address decode circuit for adding the node information and the unit information for the memory unit or the I/O unit intended as an access request destination and the cache coherence control information indicating whether the cache coherence control is required or not, to the memory access request or the I/O access request issued by the I/O device in the local node;

wherein said network unit includes a transfer unit for transferring the access request received from said intra-node connection circuit to said inter-node connection network, and a transfer unit for transferring the access request transferred thereto from said inter-node connection network to said intra-node connection network;

wherein said intra-node connection circuit includes a route designation circuit for designating the destination of transfer of the access request transferred from said inter-node connection network, based on the cache coherence control information, the node information and the unit information added to said access request, and a transfer unit for transferring said access request to a unit connected to said intra-node connection circuit in response to the designation of said route designation circuit; and wherein that access request issued by said processor or said I/O device which requires the cache coherence control is broadcast to all the nodes requiring the cache coherence control, and the access request not requiring the cache coherence control is transferred only to the node intended as a destination.

10. A node controller according to claim 9, wherein said processor unit and said I/O unit each include an information setting table for setting said cache coherence control information added to said access request, a node/unit information setting table for setting said node information and said unit information added to said access request, a holding unit for generating and holding said cache coherence control information, said node information and said unit information added to said access request according to said information setting table and said node/unit information setting table, and a reconstruction unit for reconstructing said access request using said cache coherence control information, said node information and said unit information.

11. A node controller according to claim 10, wherein said route designation circuit includes a holding unit for holding the local node information, a comparator unit for comparing the node information added to the access request transferred from said inter-node connection network with the local node information, and a control information generating unit for generating the control information for controlling the transfer path in accordance with said cache coherence control information, said unit information added to said access request and the comparison result of said comparator unit in the case where said result of the comparison is coincident.

12. A node controller according to claim 10, wherein said intra-node connection circuit includes an inter-unit address decode circuit for decoding the control information and the address information in the the memory access request or the I/O access request issued by the processor in said node, and adding to said access request the node information, the unit information and the cache coherence control information indicating whether the cache coherence control is required or not for said memory unit or said I/O unit intended as a destination of said access request.

13. A shared memory multiprocessor comprising:

a plurality of nodes each configured with at least one of a processor having a cache memory, a memory device and an I/O device; and an inter-node connection network for interconnecting a plurality of said nodes;

wherein at least one of a plurality of said nodes includes said processor and at least one each of said memory device and said I/O device, and the whole of a plurality of said nodes include at least one said processor, at least one said memory device and at least one said I/O device;

wherein each of a plurality of said nodes includes an information adding unit for adding the cache coherence control information indicating whether the cache coherence control is required or not and the node information indicating the node constituting a destination of transfer (destination of access), to the access request issued by said processor or said I/O device in the local node, and outputting the resulting information, and a transfer unit for selectively transferring the access request from said information adding unit to said inter-node connection network; and wherein said inter-node connection network includes a transfer unit which, based on said cache coherence control information and said node information added to the access request, transfers said access request to all the nodes requiring the cache coherence control among a plurality of said nodes in the case where said cache coherence control information indicates that the cache coherence control is required, and transfers said access request only to the node indicated by the node information added to said access request in the case where said cache coherence control information indicates that the cache coherence control is not required.

14. A shared memory multiprocessor according to claim 13, wherein said transfer unit of each node does not output an access request issued by the local node to said inter-node connection network in the case where, based on said cache coherence control information and said node information added to said access request, said cache coherence control information indicates that the cache coherence control is not required and the node information added to said access request indicates the local node.

15. A shared memory multiprocessor according to claim 14, wherein the information adding unit of each of a plurality of said nodes further adds the unit information indicating the unit intended as a transfer destination, to the access request issued by said processor or said I/O device in the local node, said node information indicating a node having the unit intended as a transfer destination, and wherein, based on said cache coherence control information and said node information added to said access request issued by said local node, said transfer unit of each node outputs the access request issued by the local node not to said inter-node connection network but directly to the unit in said local node indicated by said unit information added to said access request, in the case where said cache coherence control information indicates that the cache coherence control is not required and the node information added to said access request indicates the local node.

16. A shared memory multiprocessor according to claim 13, wherein said inter-node connection network includes a route designation circuit for designating the destination of transfer of said access request, and wherein said route designation circuit includes a holding unit for holding said cache coherence control information and said node information added to said access request transferred from any of a plurality of said nodes, and a transfer unit for transferring said access request to all the nodes requiring the cache coherence control of said access request among a plurality of said nodes in the case where the cache coherence control information held in said holding unit indicates that the cache coherence control is required, and transferring said access request only to the node indicated by said node information added to said access request in the case where said cache coherence control information held in said holding unit indicates that the cache coherence control is not required.

17. A shared memory multiprocessor according to claim 13, wherein said inter-node connection network is configured with a crossbar switch.

18. A shared memory multiprocessor according to claim 13, wherein said inter-node connection network includes a first crossbar switch for transferring the address section of the access request issued by said processor, said I/O device or said memory device, and a second crossbar switch for transferring the data section of said access request.

19. A shared memory multiprocessor according to claim 13, wherein said inter-node connection network includes a memory for recording the information indicating whether the cache coherence control is required for each of a plurality of said nodes, and said transfer unit of said inter-node connection network transfers said access request to the node for which said information in said memory indicates that the cache coherence control is required, in the case where said cache coherence control information indicates that the cache coherence control is required.

* * * * *